(12) United States Patent
Herzog et al.

(10) Patent No.: US 11,046,923 B2
(45) Date of Patent: Jun. 29, 2021

(54) HAND DISHWASHING CLEANING ARTICLE AND A METHOD OF MANUALLY WASHING DISHWARE

(71) Applicant: The Procter & Gamble Company, Cincinnati, OH (US)

(72) Inventors: Jennifer Lynn Herzog, Taylor Mill, KY (US); David John Pung, Loveland, OH (US); Andrew D. Maschino, Paris, IL (US); Randolph Scott McCoskey, Farmersburg, IN (US); Gregory Leo Jervier, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 63 days.

(21) Appl. No.: 16/203,144

(22) Filed: Nov. 28, 2018

(65) Prior Publication Data
US 2019/0169554 A1    Jun. 6, 2019

Related U.S. Application Data

(60) Provisional application No. 62/595,183, filed on Dec. 6, 2017.

(30) Foreign Application Priority Data

Dec. 15, 2017    (EP) .................................... 17207570

(51) Int. Cl.
*C11D 17/04* (2006.01)
*C11D 1/14* (2006.01)
(Continued)

(52) U.S. Cl.
CPC ............ *C11D 17/049* (2013.01); *B32B 27/12* (2013.01); *B32B 27/32* (2013.01); *C11D 1/008* (2013.01);
(Continued)

(58) Field of Classification Search
None
See application file for complete search history.

(56) References Cited

U.S. PATENT DOCUMENTS 5,872,090 A    2/1999  You
6,607,739 B1 *  8/2003  Wallo .................... A45D 34/04
                                                                424/401
(Continued)

OTHER PUBLICATIONS

European Search Report for Application No./Patent No. 17207570.7-1105, dated Jun. 26, 2018, 10 pages.
(Continued)

*Primary Examiner* — Lorna M Douyan
(74) *Attorney, Agent, or Firm* — Melissa Krasovec

(57) ABSTRACT

The invention relates to a hand dishwashing cleaning article having a hand dishwashing cleaning composition enclosed in a water permeable pouch. The cleaning composition has a first side and a second side and includes: (a) a surfactant system; (b) filaments; and (c) water. The pouch has a first substrate adjacent to the first side of the cleaning composition and a second substrate adjacent to the second side of the cleaning composition. The first substrate preferably includes a film, preferably a multiplanar film preferably having apertures. The second substrate includes a scrim of stretchable thermoplastic material laminated to an elastic polymeric film with openings for releasing the cleaning composition from the cleaning article.

20 Claims, 6 Drawing Sheets

(51) Int. Cl.

| | | |
|---|---|---|
| *C11D 1/29* | (2006.01) | |
| *C11D 1/94* | (2006.01) | |
| *C11D 3/04* | (2006.01) | |
| *C11D 3/22* | (2006.01) | |
| *C11D 3/38* | (2006.01) | |
| *B08B 9/20* | (2006.01) | |
| *B32B 27/12* | (2006.01) | |
| *B32B 27/32* | (2006.01) | |
| *C11D 11/00* | (2006.01) | |
| *C11D 1/83* | (2006.01) | |
| *C11D 1/00* | (2006.01) | |
| *C11D 3/382* | (2006.01) | |
| *B32B 7/12* | (2006.01) | |

(52) U.S. Cl.
CPC ............... *C11D 1/146* (2013.01); *C11D 1/83* (2013.01); *C11D 1/94* (2013.01); *C11D 3/382* (2013.01); *C11D 11/0023* (2013.01); *C11D 17/043* (2013.01); *B32B 7/12* (2013.01); *B32B 2305/026* (2013.01); *B32B 2305/18* (2013.01); *B32B 2323/043* (2013.01); *B32B 2323/046* (2013.01); *B32B 2323/10* (2013.01); *B32B 2432/00* (2013.01); *C11D 1/29* (2013.01)

(56) References Cited

U.S. PATENT DOCUMENTS

| | | |
|---|---|---|
| 9,333,151 B2 | 5/2016 | Smith, III et al. |
| 9,554,978 B2 | 1/2017 | McConaughy et al. |
| 9,855,203 B2 | 1/2018 | McConaughy et al. |
| 9,907,738 B2 | 3/2018 | McConaughy et al. |
| 10,119,104 B2 | 11/2018 | Henley et al. |
| 10,357,441 B2 | 7/2019 | McConaughy et al. |
| 2003/0121530 A1* | 7/2003 | Borgonjon ............ A47L 17/08 134/6 |
| 2003/0162684 A1 | 8/2003 | Huyhn |
| 2005/0160543 A1 | 7/2005 | Catalfamo |
| 2014/0109333 A1* | 4/2014 | Gummow ............ A47L 13/17 15/104.93 |
| 2015/0000057 A1* | 1/2015 | McConaughy .......... A61K 8/42 15/104.93 |
| 2015/0000059 A1 | 1/2015 | McConaughy et al. |
| 2015/0005221 A1 | 1/2015 | McConaughy et al. |
| 2015/0005223 A1 | 1/2015 | McConaughy et al. |
| 2016/0130021 A1 | 5/2016 | Mcconaughy |
| 2017/0096625 A1 | 4/2017 | McConaughy et al. |

OTHER PUBLICATIONS

International Search Report for International Application Serial No. PCT/US2018/062715, dated Feb. 21, 2019, 14 pages.

* cited by examiner

HAND DISHWASHING CLEANING ARTICLE AND A METHOD OF MANUALLY WASHING DISHWARE

FIELD OF THE INVENTION

The invention relates to cleaning articles and methods for cleaning hard surfaces. In particular, the invention relates to a hand dishwashing cleaning article and a method of manually washing dishware.

BACKGROUND OF THE INVENTION

A conventional method of cleaning hard surfaces with cleaning compositions such as liquid detergents typically involves the steps of applying the liquid detergent on a cleaning implement such as a washcloth, sponge, brush or the like, contacting a target hard surface to clean soil from a target hard surface preferably in the presence of water, followed by rinsing the target surface. The target hard surface may include, but is not limited to dishware, countertops, bath tubs, toilets, floors, windows, sinks and the like.

Composite cleaning sponges have been developed for use with hand dishwashing compositions to remove deposited food that adhere to the dishware. The composite cleaning sponge may comprise a foam layer and a layer of fibers made from natural or synthetic fibers (also known as a scouring pad) affixed to the foam layer typically by an adhesive. There are several drawbacks with using these sponges.

Firstly, during dishwashing, consumers would need to hold the sponge in one hand and dispense the liquid detergent from a bottle of liquid detergent or press a plunger-type detergent dispenser with the other hand to apply the detergent on the cleaning implement and/or dishware. This creates inconvenience and may result in consumers overdosing or under dosing the liquid detergent during cleaning resulting in an inefficient cleaning process.

Secondly, it has also been observed that some consumers have a habit of multi-tasking in the kitchen, i.e. cleaning and cooking at the same time such as for example, cleaning dishes in between different steps of the cooking process. Such a step of multi-tasking of washing dishes and cooking at the same time also tends to lead to overdosing of the liquid detergent and excessive water consumption.

Thirdly, while the scouring pad of the sponge is known to be effective in removing caked-on soil such as food from dish surfaces, the high stiffness property of the scouring pad does not enable the sponge to conform easily to contours of the dishware to be washed. Consequently, it is difficult to access soil stuck in difficult to reach areas (e.g., corners) of the dishware. The removed food, dirt or debris are often trapped within the scouring pad, which can serve as a breeding ground for bacteria growth. Additionally, the scouring pad is not as porous as the foam layer in the sponge, and forms an additional barrier for absorption of water or liquid hand dishwashing compositions by the sponge.

Lastly, soil and water residues may remain inside the sponges post the cleaning action. As a result the sponges are very sensitive for bacterial contamination and growth and as such start to smell. The level of preservative commonly found in traditional liquid detergent is far too low to still be effective after strong dilution during the washing process to fully address the bacterial contamination problem.

To address the abovementioned problems, some attempts have been made to combine a sponge with a cleaning composition ("cleaning devices"). Examples of such cleaning devices are disclosed in PCT WO 2012/138727 A1, U.S. Pat. Nos. 4,510,641 and 5,704,723. However, the challenge still remains of achieving a cleaning device having efficient abrasive cleaning action and controlled release of the cleaning composition contained therein.

Accordingly, there is a need for a hand dishwashing cleaning article for delivering a cleaning composition in a controlled release manner, providing effective cleaning of tough soil from surfaces, particularly hard to reach areas, and/or minimizing/preventing bacterial contamination of the cleaning composition therein. There is also a need for a method of cleaning dishware manually that makes cleaning easier for consumers.

US 2016/130021 A1 discloses personal care articles comprising personal care compositions for topical application to skin and/or hair, which comprise perfume and/or water. US 2003/162684 A1 relates to a process of cleaning dishware with a dishwashing wipe, the process involves contacting the dishwashing wipe and/or the dishware with water and subsequently contacting the dishware with the dishwashing wipe. The dishwashing wipe comprises a nonwoven or paper cleaning substrate and a comparatively more abrasive, scrubbing substrate comprising a web of fibers. US 2005/160543 A1 relates to a cleaning article, preferably a cleaning wipe, comprising a water-insoluble substrate and a cleaning composition, characterised in that the water-insoluble substrate is printed, coated or has applied thereto, an active graphic.

SUMMARY OF THE INVENTION

The present invention addresses the needs by providing a hand dishwashing cleaning article comprising a cleaning composition enclosed within a water permeable pouch. The pouch is designed to minimize/prevent dirt ingress through controlling the pore size, and the cleaning composition is formulated with a preservative to address any potential bacterial contamination. The cleaning article provides efficient abrasive cleaning action and controlled release of the cleaning composition contained therein.

In one aspect, the present invention relates to a hand dishwashing cleaning article comprising:
  (a) a hand dishwashing cleaning composition having a first side and a second side, wherein the cleaning composition comprises:
    i) from 1% to 60%, by weight of the cleaning composition of a surfactant system;
    ii) from 3% to 50%, by weight of the cleaning composition of filaments comprising fibers, fines or mixtures thereof; and
    iii) from 5% to 50%, by weight of the cleaning composition of water; and
  (b) a water permeable pouch formed around the cleaning composition, wherein the pouch comprises a first substrate adjacent to the first side of the cleaning composition and a second substrate adjacent to the second side of the cleaning composition, wherein the first substrate comprises a film comprising apertures, and wherein the second substrate comprises an elastic polymeric film comprising openings through which the cleaning composition is released from the cleaning article, and a scrim of stretchable thermoplastic material laminated to the polymeric film, wherein the first and second substrate are bound to each other through an outer sealing rim to create an enclosed space to retain the cleaning composition, characterized in that the apertures comprise tapered capillaries, wherein the tapered capillaries have a base in the plane of the first substrate and an apex remote from the plane of the first substrate, having an average base opening dimension of from 0.015 cm to 0.635 cm, and an average apex opening dimension of from 0.01 cm to 0.254 cm, and wherein the cleaning composition is in intimate contact with the apex of the tapered capillaries.

DETAILED DESCRIPTION OF THE INVENTION

Figure 1:
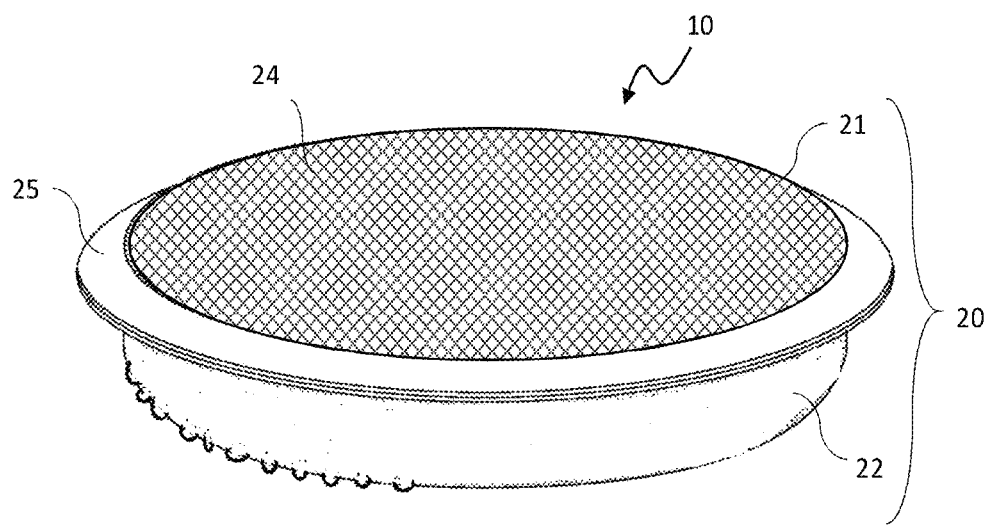
FIG. 1 is a side perspective view of a hand dishwashing cleaning article (10) according to the invention.

The present invention relates to a hand dishwashing cleaning article (hereinafter "cleaning article" or "article") and method of cleaning hard surfaces. Specifically, the cleaning article comprises a hand dishwashing cleaning composition (hereinafter "cleaning composition" or "composition") enclosed within a water permeable pouch (hereinafter "pouch"). The cleaning composition has a first side and a second side, and comprises, by weight of the cleaning composition, (a) from 1% to 60% of a surfactant system; (b) from 3% to 50% of filaments comprising fibers, fines or mixtures thereof; and (c) from 5% to 50% of water. A first substrate is bound to a second substrate through an outer sealing rim to create the pouch and an enclosed space for retaining the cleaning composition.

The first substrate preferably comprises a film, preferably a multiplanar film, preferably a Vacuum Formed Film (VFF) bi-layer film, preferably having apertures defining a gripping side of the cleaning article. The first substrate may be softer relative to the second substrate for handling by the consumer during use, e.g. this side of the pouch will likely be gripped by the consumer's hand during use. The apertures may be discontinuous, i.e., formed in at least a portion of the first substrate or continuous, i.e. formed in the first substrate (shown in FIG. 1). The apertures of the first substrate are configured to allow water to flow into the pouch of the cleaning article to mix with the cleaning composition. Subsequent manual agitation of the article enables the formation of a diluted cleaning composition and hence suds, which can then flow out of the cleaning article to facilitate cleaning of a target hard surface. The second substrate comprises an elastic polymeric film and a scrim of stretchable thermoplastic material laminated to the elastic polymeric film to define a scrubbing side of the cleaning article. A technical effect of the cleaning article having the second substrate comprising the scrim laminated to the elastic polymeric film is that it provides good cleaning on tough soil and dispenses in a controlled manner a cleaning composition from the article simultaneously during cleaning. As a result, consumers can perform surface cleaning in a single hand action thereby providing ease of use with minimizing clutter on kitchen or work top surfaces in the home.

Additionally, the elastic polymeric film of the second substrate comprises apertures configured for controlling an amount of water transported into the pouch through managing aperture size and distribution of apertures within the second substrate. The apertures are also configured for controlling a release of dissolved cleaning composition from the cleaning article and preventing soil on a target hard surface to be cleaned from entering the cleaning article, details of which will be explained hereinafter with reference to FIGS. 10A to 10C. The elastic hence flexible properties of the film allows for adaptation of the cleaning article shape towards the shape of the articles to be cleaned. The controlled dissolution profile of the cleaning composition prevents over-dosing of the cleaning composition during use, and as such extends the life of the cleaning article, allowing for multiple uses.

Definition

Prior to describing the present invention in detail, the following terms are defined for clarity. Terms not defined should be given their ordinary meaning as understood by a skilled person in the relevant art.

"Air Permeability" as used herein refers to the level of air flow in cubic feet per minute (cfm) as measured in accordance with Test Method American Society for Testing and Materials ("ASTM") D737. Air Permeability is determined by measuring the time in which a standard volume of air is drawn through the test specimen at a constant pressure and temperature. This test is particularly suited to materials having relatively high permeability to gases, such as nonwovens, apertured films and the like. A TexTest FX3300 instrument is used. (Available by Textest AG in Switzerland (www.textest.ch), or from Advanced Testing Instruments in Spartanburg S.C., USA.).

"Basis weight" as used herein refers to the weight per unit area of the substrate or the materials (e.g., scrim, films, etc.) making up the substrate. Basis weight is measured in accordance with Test Method ASTM D646.

"Cellulose" as used herein refers to cellulose in the form of filaments, including fines and fibers; and/or aggregates thereof.

"Cleaning article" as used herein, refers to an article for application to a target hard surface such as dishware, countertops, bath tubs, toilets, floors, windows, sinks and the like, preferably dishware.

"Cleaning composition" as used herein, refers to compositions intended for application to a target surface such as dishware, countertops, bath tubs, toilets, floors, windows, sinks and the like to remove, for example, cooked or baked-on food particles, soils, dirt, oil, and the like. The cleaning compositions disclosed herein can be rinse-off formulations, in which the product is applied to the target surface via, for example, an implement or substrate and then subsequently rinsed within seconds to minutes from the target surface with water. Preferably the cleaning composition is a manual dishwashing composition.

"Coefficient of Friction" or "CoF" as used herein refers to the relationship between the force of friction between the cleaning article and the surface to be cleaned as measured in accordance with Test Method ASTM D1894.

"Compliant" as used herein, refers to an article and/or composition that at least partially conforms to a surface to which it is applied by some degree of deformation.

"Compliance rate" as used herein, refers to a compliance of an article and/or composition as determined in accordance with the Compliance Test specified herein.

"Dishware" as used herein, means a surface such as dishes, glasses, pots, pans, baking dishes and flatware made from ceramic, china, metal, glass, plastic (polyethylene, polypropylene, polystyrene, etc.) and wood.

"Embossed Thickness" as used herein refers to substrate that has been embossed and having an embossed thickness as measured in accordance with Test Method ASTM D645-97.

"Fiber" as used herein refers to an elongate particulate having an apparent length exceeding its apparent diameter, i.e. a length to diameter ratio of 7 or more. Fibers having a non-circular cross-section and/or tubular shape are common; the "diameter in this case may be considered to be the diameter of a circle having cross-sectional area equal to the cross-sectional area of the fiber. "Fiber length", "average fiber length" and "weighted average fiber length", are terms used interchangeably herein all intended to represent the "Length Weighted Average Fiber Length". Fiber length and diameter can be measured in accordance with standard procedures and machinery, like a STFI FiberMaster available from Innventia AB, Sweden. The recommended method for measuring fiber length using this instrument is essentially the same as detailed by the manufacturer of the Fiber Master in its operation manual.

"Filament" as used herein refers to a combination of fibers and fines.

"Fine as used herein refers to both primary and secondary fines (unless otherwise noted) which are water insoluble materials that pass through a 200 mesh screen under conditions defined in the TAPPI method T-261(80). "g/use" as used herein, refers to grams per use. This is the unit used for rate of consumption and the method for measuring and/or calculating it is described below.

"Macroapertured" refers to a substrate containing well-defined apertures having an average diameter of about 300 microns or greater.

"Microapertured" as used herein, refers to a substrate containing well-defined microscopic apertures have a diameter of 300 microns or less.

"Natural" as used herein, refers to materials that can be derived from plants, animals, insects, or materials that can be byproducts of plants, animals, or insects.

"Nonwoven" as used herein, refers to a substrate comprising fibers not woven into a fabric but rather formed into a sheet. The fibers can either be random (i.e., randomly aligned) or the fibers can be non-random (for example, the nonwoven can be carded, i.e., combed to be oriented in primarily one direction).

"Reusable" as used herein, refers to an article that can be used for a number of usage events, such as multiple dishwashing cycles, wherein the number of usage events can be 2 or greater, 5 or greater, 7 or greater, 10 or greater, 15 or greater, 20 or greater, 25 or greater, or 30 or greater.

"Substantially free of" as used herein, refers to 5% or less, 3% or less, 1% or less, or 0.1% or less of a stated ingredient. "Free of" refers to no detectable amount of the stated ingredient or thing.

"Substrate" as used herein, refers to a material which can limit the amount of water to which a cleaning composition is exposed during a usage event versus exposure of a cleaning composition itself absent a substrate. The substrate may be, for example, a film, formed film, batting, woven, nonwoven, or a combination thereof.

"Suds profile" as used herein, refers to the amount of sudsing (high or low) and the persistence of sudsing (sustained sudsing) throughout the washing process resulting from the use of the cleaning composition. "High sudsing" as used herein, refers to cleaning compositions which are both high sudsing (i.e., a level of sudsing considered acceptable to the consumer) and have sustained sudsing (i.e., a high level of sudsing maintained throughout a substantial portion of all of the cleaning operation).

"Synthetic" as used herein, refers to materials that can be obtained primarily from various man-made materials or from natural materials which have been altered.

"Tensile strength" is measured at the Peak using the Test Method ASTM D882 in the machine direction (MD) and transverse direction (TD).

"Usage event" as used herein, refers to one 5 minute cycle of the Consumption Test below.

"Water insoluble substrate" as used herein, refers to a substrate which does not dissolve in water during the life of the article.

In the following description, the cleaning article described is a consumer product, such as a cleaning article for cleaning dishware. However, it is contemplated that the cleaning article may be configured for use in a variety of applications to clean hard surfaces including but not limited to dishware, countertops, bath tubs, toilets, floors, windows, sinks and the like to remove, for example, cooked or baked-on food particles, soils, dirt, oil, and the like.

Cleaning Article

Figure 2:
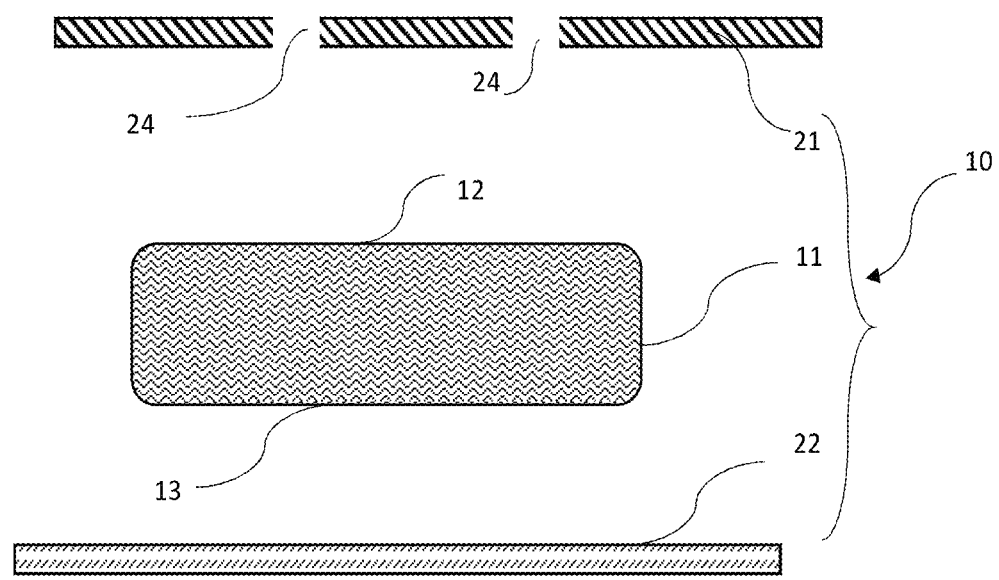
FIG. 2 is a side schematic view of components of the hand dishwashing cleaning article (10) of FIG. 1.

FIG. 1 is a perspective view of a cleaning article (10) according to the present invention and FIG. 2 is a perspective view of components in the cleaning article (10). The cleaning article (10) can be constructed as a disposable, reusable article or one that is replenished with a cleaning composition (11). Preferably the cleaning article (10) will last for multiples uses and cannot be replenished by the consumer.

Figure 3:
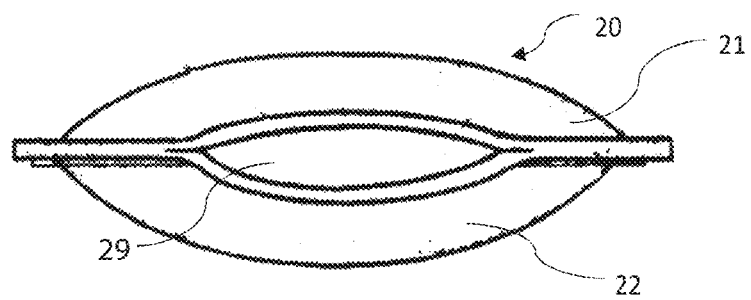
FIG. 3 is a cross-sectional schematic end view of a first substrate (21) attached to a second substrate (22) to form a water permeable pouch (20) of a hand dishwashing cleaning article (10), and comprising a pouch opening (29) according to the invention.

With continued reference to FIG. 1, the cleaning article (10) comprises a first substrate (21) attached to a second substrate (22) for forming a pouch (20) for containing a cleaning composition (11). The first and second substrates (21, 22) may be sealed by heat sealing, by using an adhesive, or mixtures thereof, preferably by heat sealing. As explained below in connection with FIGS. 2 and 8, the cleaning composition (11) is located between the first and second substrates (21, 22). The cleaning composition (11) may be in a solid, semi-solid, or gel form, preferably semi-solid and includes a first side (12) and a second side (13). The first substrate (21) is adjacent to the first side (12) of the cleaning composition (11), while the second substrate (22) is adjacent to the second side (13). The first and second substrates (21, 22) may, however, be sealed in other configurations. For example, the pouch (20) may only be partially sealed so as to form a pouch opening (29) (as shown in FIG. 3). It is understood that this partial sealed pouch (20) is desirable in certain situations. For example, the pouch (20) is manufactured at one manufacturing site and then assembly of the cleaning composition (11) with the pouch (20) to form the cleaning article (10) is performed at a different manufacturing site.

Figure 8:
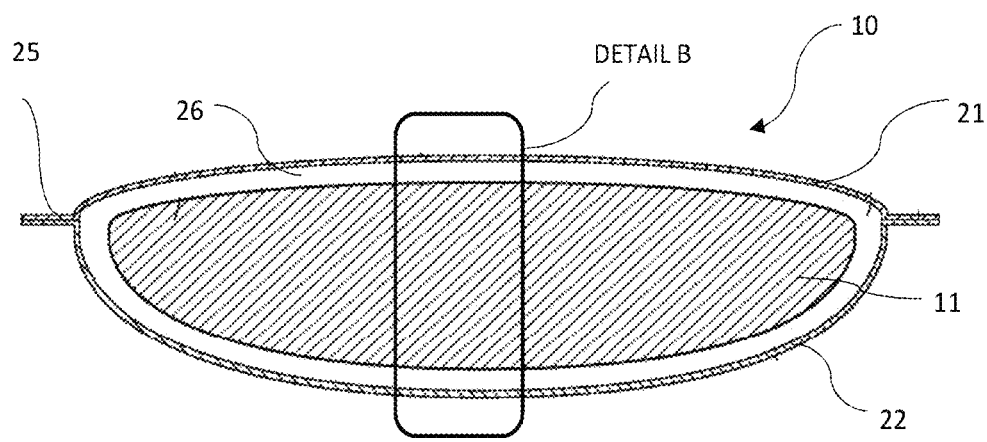
FIG. 8 is a cross-sectional schematic view of a hand dishwashing cleaning article (10) according to the present invention.

Referring to FIG. 1, the first and second substrates (21, 22) may be sealably attached to each other to define an outer sealing rim (25) of the cleaning article 10 to create an enclosed space (26) to retain the cleaning composition (11) (as shown in FIG. 8). In particular, the enclosed space (26) may be an open area or space between at least one of the first and second substrates (21, 22) and the cleaning composition (11), where the at least one of the first and second substrates (21, 22) is not touching the cleaning composition (11). The substrate(s) (21, 22) may be flexible such that they touch the composition (11) in some areas and not others. The areas where the substrate (21, 22) is touching or not touching the composition (11) may shift as the substrate(s) and composition shift during handling and/or use of the article (10).

The cleaning article (10) can be compliant. In other words, the cleaning article (10) is expected to at least partially conform to the surface to which it is applied by some degree of deformation. For example, the cleaning article (10) may be configured to bend to some degree to more fully contact a curved or angled surface (500) like a sink, dishware or toilet such as shown in FIG. 10C. Thus, if the cleaning article (10) is originally flat with no curve, when applied to the target hard surface for cleaning there would be some amount of bend to better conform to the target hard surface. Likewise, if the article's shape has a small amount of a curve, when applied to the target surface the article would bend to some degree to more fully contact the target surface. Oppositely, if the original cleaning article (10) is curved such that it would not need to bend to conform to a curved target surface, then it would bend to straighten when applied to a less curved surface like the floor or a dish. Preferably, the cleaning article (10) and/or composition (11) is fully compliant meaning it is capable of completely conforming to the surface to which it is applied.

Compliance of the cleaning article (10) is determined in accordance with the Compliance Test specified herein. The cleaning article (10) may comprise a compliance value of 1.50 Kg/mm or less. The compliance value of the article (10) may be preferably 1.35 Kg/mm or less; more preferably 1.25 Kg/mm or less; more preferably 1.2 Kg/mm or less; more preferably 1.1 Kg/mm or less; or most preferably 1.0 Kg/mm or less. The article preferably has a compliance of from 0.01 Kg/mm to 1.50 Kg/mm; from 0.03 Kg/mm to 1.50 Kg/mm; from 0.05 Kg/mm to 1.25 Kg/mm; from 0.05 Kg/mm to 1.15 Kg/mm; from 0.10 Kg/mm to 1.1 Kg/mm; or any combinations thereof.

The cleaning composition (11) can also be compliant similar to what is discussed above for the article (10). A level of compliance could be altered by varying the amount of cellulose fibers to meet usage requirements. Specifically, more cellulose fibers may make the cleaning composition (11) stiffer and less compliant. For example, the cleaning composition (11) may bend to some degree to more fully contact a curved surface like a sink, dishware or toilet. Thus, if the cleaning composition (11) is originally flat with no curve, when applied to the target surface for cleaning, there would be some amount of bend to better conform to the target surface. Likewise, if the composition's (11) shape has a small amount of a curve, when applied to the target surface the composition (11) would bend to some degree to more fully contact the target surface. Oppositely, if the original composition is curved such that it would not need to bend to conform to a curved target surface like the arm, then it would bend to straighten when applied to a less curved surface like the floor or a flat dish. Compliance of the composition (11) can be measured according to the Compliance Test described herein. The cleaning composition (11) may have a compliance value of 1.50 Kg/mm or less; 1.35 Kg/mm or less; 1.25 Kg/mm or less; 1.2 Kg/mm or less; 1.1 Kg/mm or less; or 1.0 Kg/mm or less. The composition (11) may have a compliance value of from 0.01 Kg/mm to 1.50 Kg/mm; from 0.03 Kg/mm to 1.50 Kg/mm; from 0.05 Kg/mm to 1.25 Kg/mm; from 0.05 Kg/mm to 1.15 Kg/mm; from 0.10 Kg/mm to 1.1 Kg/mm; or any combinations thereof.

The composition (11) and/or article (10) may become compliant after exposure to water. Thus, the non-compliant composition (11) or article (10) may, after exposure to a liquid, like water, during a usage event, becomes compliant. If the article (10) and/or composition (11) become compliant by the end of a second usage event, then they are considered compliant according to this application.

The cleaning article (10) may have a rate of consumption as determined according to the Consumption Rate Test described herein. This is a measure of how much of the cleaning composition (11) is used during a usage event. The cleaning article (10) may have a consumption rate of 20 g/use or less, 15 g/use or less, from 1.5 g/use to 15 g/use; from 2.5 g/use to 10 g/use; from 3.5 g/use to 6.5 g/use, or any combinations thereof.

The cleaning article (10) can include from 0.5% to 25,000%, by weight of total substrate(s), of the cleaning composition (11). The article (10) may comprise greater than 500%, by weight of the total substrate(s), of the cleaning composition (11). Preferably, the article (10) comprises greater than 1,000%, by weight of the total substrate(s), of a composition (11). More preferably the article (10) may comprise greater than 1,500%, by weight of the total substrate(s), of a composition (11); even more preferably greater than 2,000%, by weight of the total substrate(s), of a composition; even more preferably greater than 2,000% and less than 10,000%, by weight of the total substrate(s), of a composition; most preferably greater than 2,000% and less than 5,000%, by weight of the total substrate(s).

The cleaning article (10) may be in any suitable shape, for example, oval, square, rectangular, circular, triangular, hour glass, hexagonal, c-shaped, or the like. Further, the cleaning article (10) can include a gripping side defined by the first substrate (21) and a scrubbing side defined by the second substrate (22). The first substrate (21) and the second substrate (22) may be configured to provide a variety of textures for different degrees/levels of cleaning (for example, light duty cleaning of dishware which are not heavily soiled or heavy duty cleaning of dishware which has tough soil). The first substrate (21) can include a texture that is the same as the second substrate (22). As shown in FIG. 1, the first substrate (21) can include a texture that is different than the second substrate (22).

A combination of substrates (21, 22) can be used to form the water permeable pouch (20) so as to give different user experience properties, and also to give other desirable properties of an article (10) such as for example, an appropriate consumption rate and suds profile. When combining substrates to form an article (10), one should consider the properties of the composition (11), in addition to the individual properties of the substrates (21, 22), to come up with the article (10) with the desired properties. Examples of suitable physical parameters of the first and second substrates (21, 22) are described below.

First Substrate

Figure 4A:
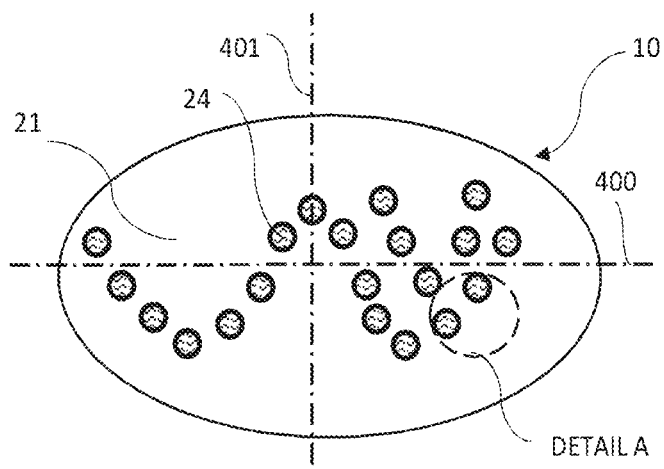
FIG. 4A is a schematic top view which show different configurations of apertures (24) of the first substrate (21) in a hand dishwashing cleaning article (10) according to the present invention.

The first substrate (21) is a film having properties that give the film a permeable quality capable of allowing gas or fluid (e.g., vapor, air or liquid) flowing in and out of the first substrate (21). Preferably, the first substrate (21) is an apertured film, preferably an apertured Vacuum Formed Film ("VFF") made from a porous material that is fluid permeable. For example, with reference to FIGS. 1 and 2, the first substrate (21) may comprise apertures (24) for enabling the passage of water flow through the material of the first substrate (21). The geometry of the apertures (24) are described in further detail below with reference to FIGS. 2, 4A and 4B.

The first substrate (21) can be apertured film in at least one portion of the first substrate (21) and non-apertured in other portions of the first substrate (21). For example, the first substrate (21) may comprise one or more openings, the one or more openings including well-defined apertures (24) (shown in FIG. 4A) such as microapertures or macroapertures, holes, perforations, cavities, raised or depressed fibrous and/or non-fibrous regions, gaps between regions, and the like that can enable, for example, water and/or the cleaning composition (11) to pass through the first substrate (21). Preferably, the first substrate (21) is provided with apertures (24) comprising tapered capillaries (40) or orifices of critical opening dimensions and of critical angles of taper, each of which has a base (41) in the plane of the first substrate (21) and an apex (42) of which may be in contact with the cleaning composition (11). Tapered capillaries (40) are shown in perspective in FIG. 14 and in cross-section in FIG. 15. With continued reference to FIG. 15, each of the tapered capillary (40) has an angle of taper is represented by a. Preferably the average angle of taper (a) of the tapered capillaries (40) is from 10° to 60°. Preferably the average base opening dimension (43) of the tapered capillaries (40) is from 0.015 cm to 0.635 cm. Preferably the average apex opening dimension (44) is from 0.01 cm to 0.254 cm. The cleaning composition (11) is preferably in intimate contact with the apex (42) of the tapered capillaries (40). By "in intimate contact" it is meant, that preferably at least 50%, more preferably at least 65%, still more preferably at least 80% by number of the apexes (42) are in contact with the cleaning composition (11).

Figure 14:
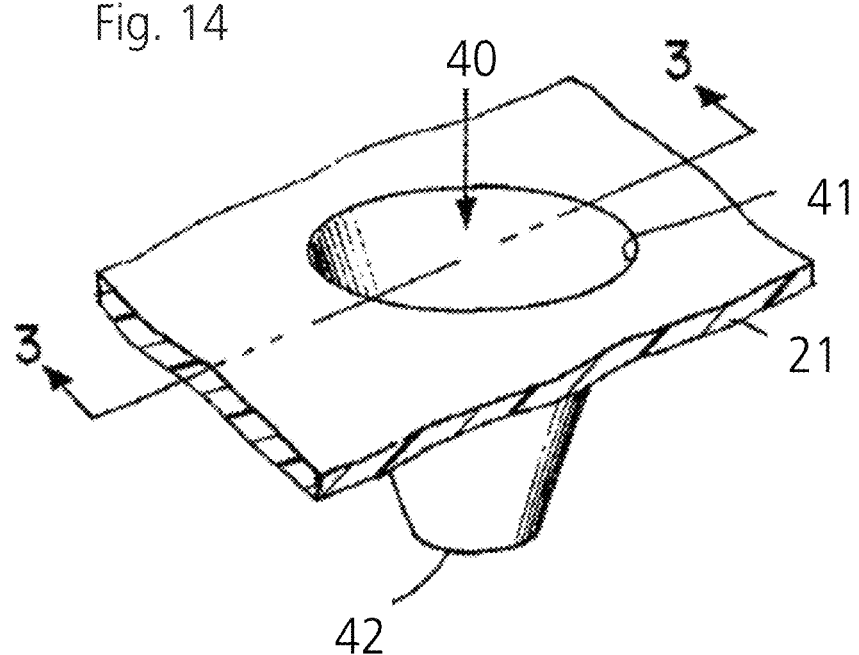
FIG. 14 is an enlarged fragmentary perspective view of a tapered capillary (40) as used in this invention.
Figure 15:
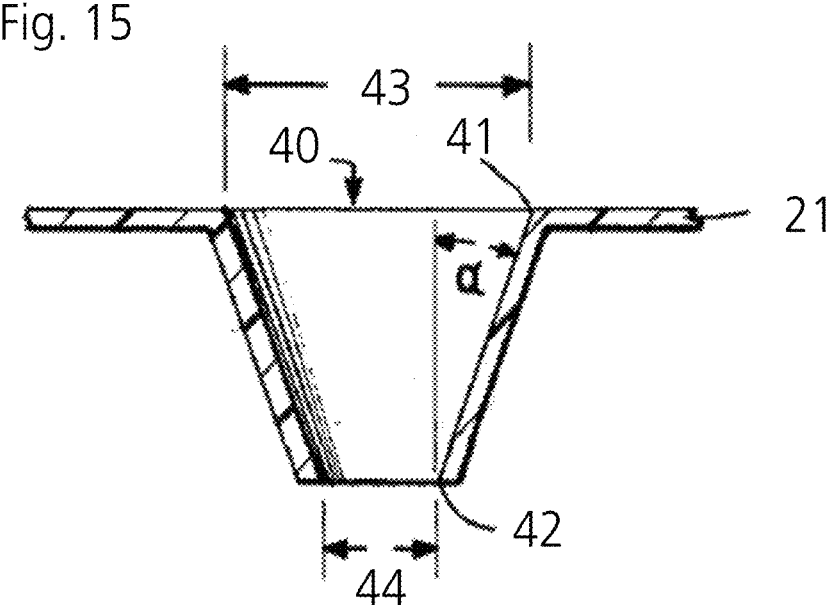
FIG. 15 is a cross-section in elevation of a tapered capillary (40) taken along the line 3-3 in FIG. 14.

Apex opening dimension (44) is defined as the maximum open measurement in the apex of tapered capillary (40) which apex (42) is remote from the plane of the first substrate (21). When tapered capillary (40) is shown in FIGS. 14 and 15 as generally in the form of a frustrum of a conical surface, it is to be understood that any generally tapered structure, such as a frustrum of a pyramid or the like with a triangular, square or polygonal base, is within the scope of the invention; circular tapered capillaries, however, are used in this description for convenience in explaining the manifold advantages of the invention. It is also to be understood that the tapered capillaries (40) can be asymmetric (i.e., the angle of taper (a) on one side can be different from that on another side) and that the angle of taper (a) can change continuously (i.e. be curved) over the distance from base (41) to apex (42). In the latter case, the angle of taper is defined as the angle of the tangent to the side of the tapered capillary (40) at its point of minimum apex (42) opening dimension. Also included in the term tapered capillary (40) is a slot formed into first substrate (21), the lot having finite length less than the width of the first substrate (21) and having its sides and ends tapered at angles analogous to those hereinafter described in relation to a circular tapered capillary. The tapered capillaries (40) may have a hole in the bottom thereof for flow of liquid and cleaning composition (11) therethrough.

Figure 4B:
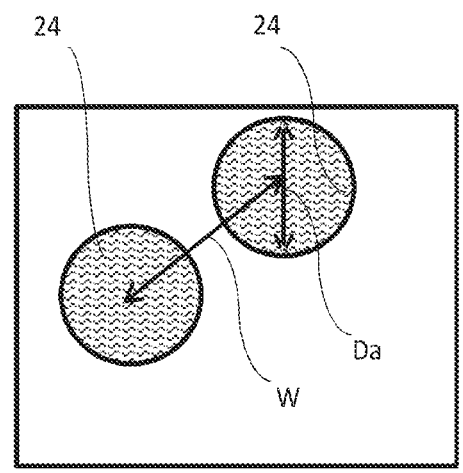
FIG. 4B is a detailed view of a portion of the first substrate (21) of the cleaning article (10) of FIG. 4A.

The first substrate (21) may have a pore opening area of from 2% to 20% to control the amount of water entering the pouch (20) for dissolving the cleaning composition (11). Specifically, the first substrate (21) may comprise an average from 5 apertures/cm$^2$ to 100 apertures/cm$^2$, preferably from 10 apertures/cm$^2$ to 50 apertures/cm$^2$, more preferably from 15 apertures/cm$^2$ to 30 apertures/cm$^2$ Referring to FIG. 4A, preferably the apertures (24) may be arranged in an axially staggered pattern relative to a horizontal axis (400) or a vertical axis (401) of a top view of the article (10). Referring to FIG. 4B, preferably the apertures (24) may be arranged in a pattern having an average spacing W of at least 0.4 mm, preferably from 0.5 mm to 5 mm, between centers of adjacent apertures (24). Preferably, the apertures (24) are formed using rotary knife aperturing ("RKA") as described in U.S. Pat. No. 7,935,207 (Procter & Gamble).

Figure 9:
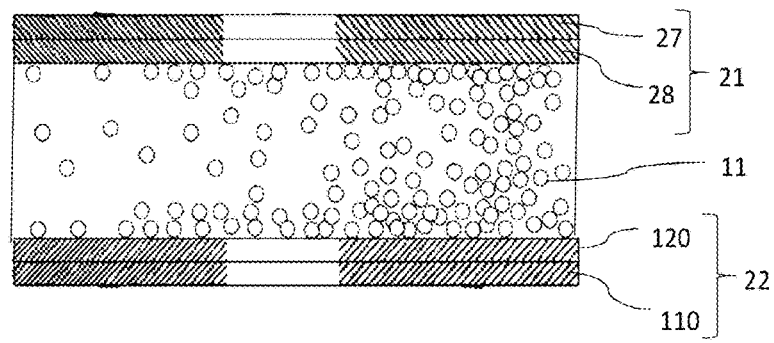
FIG. 9 is a detailed view A of the hand dishwashing cleaning article (10) of FIG. 8.

The first substrate (21) may be a multiplanar film, preferably a VFF bilayer film comprising two layers such as shown in FIG. 9. With continued reference to FIG. 9, the first substrate (21) may comprise at least one high modulus outer layer (27) bound to at least one inner sealant layer (28) to define the multiplaner, preferably bilayer, film. The high modulus outer layer (27) may comprise a material having a secant modulus and a specified thickness that allows the article (10) to effectively conform/adapt to the shape of the target hard surface to be cleaned. Preferably, the high modulus outer layer (27) may be selected from a material having 2% secant modulus greater than 100,000 psi. The high modulus outer layer (27) may comprise a thickness of 8 microns to 200 microns. The high modulus outer layer (27) may comprise at least one adhesive A for attachment to the inner sealant layer (28). The adhesive A may be configured to provide a peel force of at least 1 lb per inch as measured according to the Peel Force Test Method disclosed in U.S. Pat. No. 9,550,301.

The at least one high modulus outer layer (27) and/or the at least one inner sealant layer (28) can comprise apertures (24). The apex (42) of the tapered capillaries (40) of the apertures (24) of the at least one high modulus outer layer (27) can be remote from the cleaning composition (11), and the the apex (42) of the tapered capillaries (40) of the apertures of the inner sealant layer (28) can be in intimate contact with the cleaning composition (11). As the first substrate (21) may be a bi-layer film, one layer of film may comprise apertures (24) wherein the apex (42) of the tapered capillaries (40) may be remote the cleaning composition (11) and the second layer of film may comprise apertures (24) wherein the apex (42) of the tapered capillaries (40) may be in intimate contact with the cleaning composition (11).

The VFF multilayer film can be made from a multi-planar film which is vacuum formed, using processes known to those skilled in the art. The at least one high modulus outer layer (27) and/or to at least one inner sealant layer (28) can be made from high density polyethylene (HDPE), low density polyethylene (LDPE), or a blend thereof, though blends are preferred. Such blends have been found to provide improved resiliency of the apex (42) of the tapered capillaries (40), and hence more consistent diffusion of the cleaning composition (11) through the tapered capillaries (40), resulting in an increase in product longevity.

At least one of the first substrate (21) or second substrate (22) or both, preferably both, may be water penetrable. Water penetrability refers to substrates (21, 22) having a water flux rate as determined in accordance with the Water Flux Rate Test described herein. The water flux rate can be used to limit wetting of the cleaning composition (11) included in the cleaning article (10) thereby controlling suds, dissolution, and/or consumption of the composition (11) included in the cleaning article (10). Without being limited by theory, the first substrate (21) can manage or limit the water flux rate to provide controlled wetting and to extend a useful life of the cleaning composition (11) while still enabling enough wetting to provide, for example, suitable suds. The water flux rate can be from 0.1 $cm^3/cm^2/s$ to 200 $cm^3/cm^2/s$, from 0.4 $cm^3/cm^2/s$ to 120 $cm^3/cm^2/s$, from 20 $cm^3/cm^2/s$ to 100 $cm^3/cm^2/s$, or any combination thereof, as measured by the water flux rate test disclosed below. The ability to control the water flux rate allows for adjustment such that the cleaning composition can be reused and, thus, lasts through a number of uses while still exhibiting sudsing and cleaning characteristics as desired by consumers. There may be a water flux differential between the first and second substrates (21, 22). The flux differential between the first and second substrates (21, 22) may be at least 2.5 $cm^3/cm^2/s$; 3.0 $cm^3/cm^2/s$ or more; or 4.0 cm $cm^3/cm^2/s$ or more.

The first substrate (21) may comprise a sufficient tensile strength as determined in accordance with the Substrate and Article Tensile Test described herein in order to effectively fulfill its desired role. For example, the first substrate (21) may comprise a lower tensile strength relative to the second substrate (22) due to an intended contact for light duty usage of cleaning dishware that do not have tough soils. The first substrate (21) may be configured to have an ultimate tensile strength of about 10 g/mm width or greater, 30 g/mm (width) or greater, 60 g/mm (width) or greater, or 200 g/mm (width) or greater and a stiffness of 1 g/mm (width) or greater, 2 g/mm (width) or greater, 7 g/mm (width) or greater, 20 g/mm (width) or greater, or 80 g/mm (width) or greater.

The first substrate (21) can be a film (e.g., a formed film). However, one skilled in the art may recognize that the first substrate (21) can be a nonwoven (i.e., a natural or synthetic nonwoven including fibrous and nonfibrous nonwovens), a woven, a sponge (e.g. a natural and/or synthetic sponge), a polymeric netted mesh (i.e., a "scrim"), a batting, spunbond, spunlace, hydroentangled, carded, needlepunch, or any other suitable material. A first substrate (21) typically has land regions (i.e., regions that do not allow water and/or the cleaning composition (11) to pass through) and openings. The first substrate (21) can provide sufficient air space between, for example, openings and land regions of the first substrate (21) and can help control water permeability of the first substrate (21).

Suitable fibrous nonwovens for use as a substrate in a cleaning article can include a spunlaid hydroentangled 100% polypropylene (PP) available from Avgol Nonwovens, NC, USA; a carded, calendar bonded all bi-component polypropylene/polyethylene (PP/PE) fiber available from Fiberweb Inc., TN, USA; a spunbond, overbonded 100% PP, and a carded, through air bonded 30/30/40 PP/Bi-component PP-PE/Rayon.

An additional nonwoven suitable for use as a first substrate (21) includes batting fibers which can include fusible battings. Fusible battings may be fused, for example, by thermoplastic adhesives or via bicomponent fibers. For example, a nonwoven substrate can include a low loft all polyester batting available from Fairfield Processing, Danbury, Conn., USA; a low loft all polyester, ½ thickness (peeled) batting available from Fairfield Processing, Danbury, Conn., USA; a PROEF 12-334 polyester-bicomponent fiber blend batting available from Libeltex, Belgium; a PROEF 12-370 dual layer PET/copet bico and PP fibers available from Libeltex, Belgium; a bulk layer with standard PET/coPET bicotrilobal fibers available from Libeltex, Belgium; a dry web T30 SC batting, hollow PET+bico PET/PE fiber blend, air bonded available from Libeltex, Belgium; a PROEF 12-372 batting, coarse polyester and PE/PET bico fibers available from Libeltex, Belgium; and a dry web T23W batting, coarse polyester and bico fiber mix available from Libeltex, Belgium.

Polymeric netted meshes or scrims can also be useful as a first substrate (21) for a cleaning article (10). Some examples can include those described in U.S. Pat. No. 4,636,419. Preferably, the first substrate (21) comprises a polypropylene scrim or a polyethylene scrim. Preferably, the first substrate (21) comprises a low density polyethylene scrim.

The first substrate (21) may comprise a polymeric mesh sponge. Some suitable polymeric mesh sponges are described in European Patent Application No. EP 702550A1 published Mar. 27, 1996. Polymeric mesh sponges can comprise a plurality of plies of an extruded tubular netting mesh prepared from a strong flexible polymer, such as addition polymers of olefin monomers and polyamides of polycarboxylic acids.

The first substrate (21) can also be a composite material that includes, for example, one or more plies of the same or different materials such as nonwovens, wovens, films, sponges, scrims, battings, and the like superimposed physically, joined together continuously (e.g., laminated, etc.) in a discontinuous pattern, or by bonding at the external edges (or periphery) of the substrate and/or at discrete loci. The first substrate (21) can be a composite material comprising at least one formed film and at least one nonwoven where the first substrate (21) can be vacuum-formed. Such a suitable formed film composite material can include, for example, a vacuum-laminated composite formed film material that can be made or formed by combining a carded polypropylene nonwoven having a basis weight of 30 gm with a formed film.

Suitable formed films for use as a first substrate (21) in the cleaning article (10) can include plastic formed films, such as polyolefins, including, for example, low density polyethylene (LDPE) films, hydroapertured polyethylene films with one or more openings such as apertures of from about 0.1 mm to about 3 mm, and combinations thereof. When selecting formed films, some parameters to consider include:

thickness, pattern, polymer stiffness, and permeability. Thickness can be measured by physical measurement of the thickness (like by using a caliper) or basis weight. Preferably, the thickness of the film for the first substrate (21) is from 1.5 mm to 5 mm Preferably, the film for the first substrate (21) has a basis weight from 10 g/m$^2$ to 100 g/m$^2$. This basis weight allows for the first substrate (21) to be compliant with the surface that the cleaning article (10) contacts with, and feels soft or mild to consumer group. The pattern of apertures (24) disposed on the first substrate (21) may be configured to adapt properties of appearance and cleaning ability of the cleaning article (10).

Polymer stiffness of formed films affects texture and bending. When looking at polymer stiffness, the glass transition temperature (Tg) of the polymer is a good indicator for determining a stiffness of the polymer. A polymer used to form a first substrate (21) may comprise a Tg of 20° C. to 125° C. Additionally, as described above, a first substrate (21) can include one or more openings such that water, the composition (11), and/or suds, for example, can pass through the first substrate (21). As explained below in connection with FIGS. 10A and 10B, where the first substrate (21) and the second substrate (22) are adjacent to the composition (11), the water (101) may passes through at least one of the first and second substrates (21, 22) to interact with the cleaning composition (11). As the cleaning composition (11) dissolves, dissolved cleaning composition (11A) will then also pass through the second substrate (22) to be delivered to the target hard surface (e.g., dishware).

A water permeability of the first substrate (21) can be selected based on the dissolution half-life of the cleaning composition (11) and the desired reusability of the article (10). For example, when the dissolution half-life of the cleaning composition (11) is high, a higher level of permeability can be selected to counteract the high dissolution half-life and provide a desirable consumption rate for the cleaning article (10). Alternatively, when the dissolution half-life of the cleaning composition (11) is low, the water permeability of the first substrate (21) can be lower and still provide a desirable consumption rate for the article (10). Preferably, a substrate can include a permeability of 1 opening/cm$^2$ or greater, 10 openings/cm$^2$ or greater, 100 openings/cm$^2$ or greater, 500 openings/cm 2 or greater, 1,000 openings/cm$^2$ or greater, 1,500 openings/cm$^2$ or greater, or any combinations thereof.

Preferably the first substrate (21) is apertured VFF having apertures (24) that are hexagonal shape and the mesh count for the apertures (24) is 22 per linear inch. Suitable non-limiting examples of the apertured VFF for the first substrate (21) is selected from the group consisting of: apertured VFF disclosed in U.S. Pat. Nos. 7,819,852; 3,929,135; 4,324,246; 4,342,314; 4,463,045; 4,629,643; 5,006,394; and 5,603,707; apertured VFF obtained from Tredegar Film Products under the designation X27121; and apertured VFF obtained from Tredegar Film Products under the designation X-39095 (Hex22); preferably Hex22. Apertured VFF is made according to the method as disclosed in U.S. Pat. No. 4,456,570. Preferably, the method comprises forming a hot film of thermoplastic material, applying the hot film to a moving perforated screen and applying an air pressure differential across the film toward a portion of the screen sufficient to distort the film into the perforations and cause rupture of the film.

Second Substrate

Figure 5A:
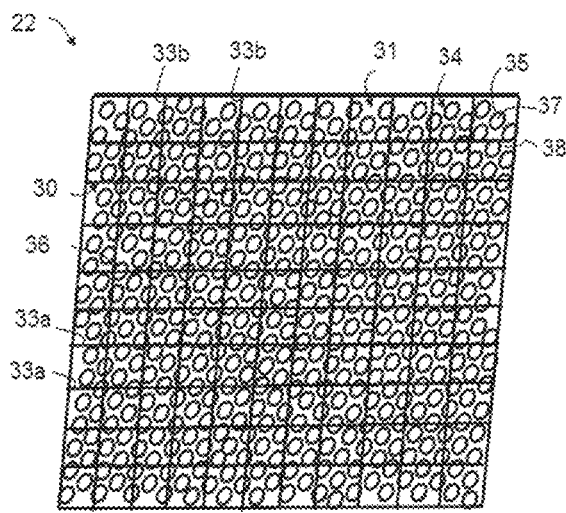
FIG. 5A is a schematic top view of a second substrate (22) in a hand dishwashing cleaning article (10) according to the present invention.
Figure 5B:
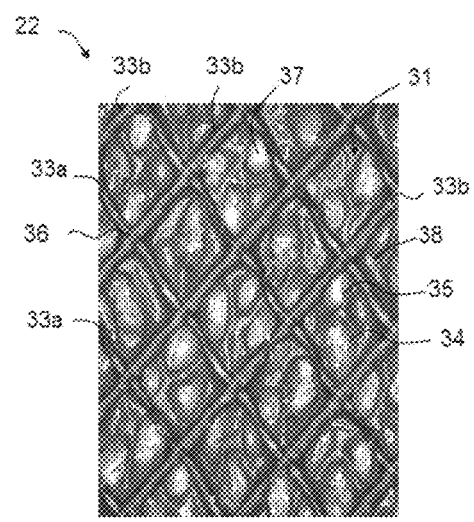
FIG. 5B is a picture that illustrates a bottom view of the second substrate (22) of FIG. 5A.

The second substrate (22) can comprise different material(s) from the first substrate (21). Preferably the second substrate (22) is for scrubbing soiled hard surfaces, while the first substrate (22) is for gripping by the user or for scrubbing light soil or greasy soils. FIGS. 5A and 5B illustrate a second substrate (100) for a cleaning article (10). As illustrated, the second substrate (22) includes a scrim (30) and an elastic polymeric film (31) attached to the scrim (30). The elastic polymeric film (31) may be a formed film and the scrim (30) may be a woven scrim. The elastic polymeric film (31) encompasses at least 50% of the circumference of each of the plurality of filaments and includes a plurality of apertured extended cells (34) extending away from the scrim (30).

Figure 6A:
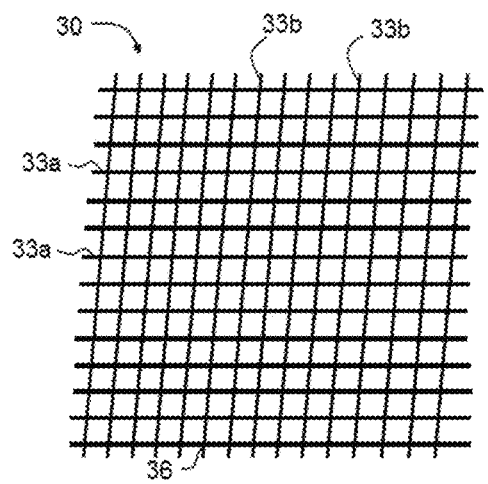
FIG. 6A is a schematic top view of a scrim (30) that is part of the second substrate (22) of FIG. 5A.
Figure 6B:
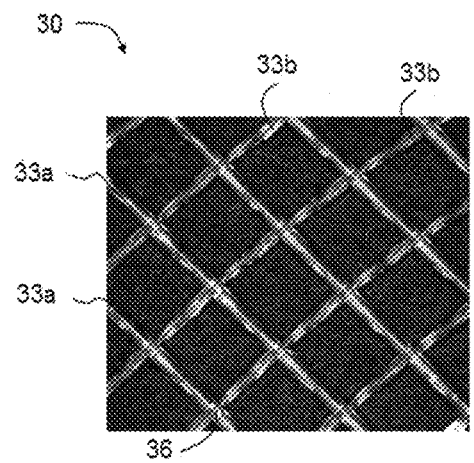
FIG. 6B is a picture that illustrates the scrim (30) that is part of the second substrate (22) of FIG. 6A.

FIGS. 6A and 6B show the scrim (30) in further detail. Specifically, the scrim (30) includes a plurality of scrim filaments (33a, 33b) that are arranged in a mesh-like or net-like pattern, with the scrim filaments (33a) being substantially parallel to and spaced from each other, and the scrim filaments (33b) being substantially parallel to and spaced from each other, as well as oriented at an angle to the scrim filaments (33a). The two sets of scrim filaments (33a, 33b) cross and are connected at intersections (36) by known methods. Each of the scrim filaments (33a, 33b) may be made from the same material, such as polypropylene, for example. Preferably, the scrim filaments (33a, 33b) may be made from different materials, such as polypropylene and polyethylene, respectively, for example. Preferably the plurality of scrim filaments (33a, 33b) have an average a diameter in the range of 250-760 micrometers (10-30 mils), or in the range of 380-635 micrometers (15-25 mils), or in the range of 430-560 micrometers (17-22 mils). Preferably, the scrim filaments (33a) may have a different average diameter than the scrim filaments (33b). Preferably the average spacing between adjacent scrim filaments (33a, 33b) may be in the range of 2.0-4.0 millimeters (78-158 mils), or in the range of 2.5-3.5 millimeters (98-138 mils), or in the range of 2.8-3.3 millimeters (115-125 mils), and the scrim filaments (33a, 33b) that intersect may be oriented substantially orthogonally to each other ±15°. Preferably, the spacing between the scrim filaments (33a) may be different than the spacing between the scrim filaments (33b). Preferably, the scrim (30) may have a basis weight in the range of 50-70 grams per square meter (gsm), or in the range of 55-65 grams per square meter (gsm), or in the range of 60-65 grams per square meter (gsm).

Returning to FIGS. 5A and 5B, the elastic polymeric film (31) may be a formed film attached to the scrim filaments (33a, 33b), as described in further detail below. The elastic polymeric film (31) includes a plurality of apertured extended cells (34) that extend away from the scrim (30). Each of the apertured extended cells (34) includes a continuous sidewall (35) surrounding an aperture (37) that extends through the formed film (31). Each sidewall (35) starts at a land (38) of the elastic polymeric film (31) and has a thickness that decreases as the sidewall (35) extends away from the land (38), and scrim (30), to a distal end. It is contemplated that not all of the extended cells may be apertured extended cells and that some of the extended cells will not have an aperture that extends therethrough but instead will have solid distal ends, as would be understood by persons of ordinary skill in the art. In addition, although FIG. 5A schematically illustrates that the apertured extended cells (34) have the same size, or the apertured extended cells (34) may have different sizes, as shown in FIG. 5B. Preferably, the elastic polymeric film (31) may have a basis weight in the range of 25-50 grams per square meter (gsm), or in the range of 30-45 grams per square meter (gsm), or in the range of 35-40 grams per square meter (gsm).

Figure 7A:
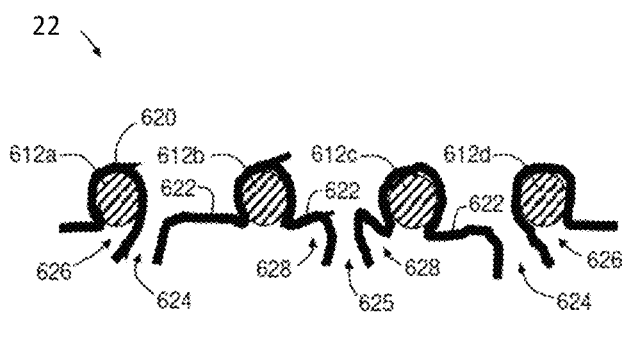
FIG. 7A is a schematic view of an enlarged view of a cross-section of the second substrate (22) of FIG. 5A.
Figure 7B:
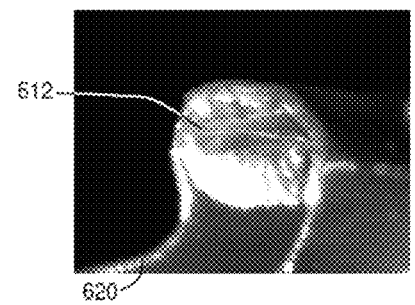
FIG. 7B is a picture of a magnified cross-section of a portion of the second substrate (22) of FIG. 5B showing a filament of the scrim (30) attached to an elastic polymeric film (31).

FIG. 7A is a detailed schematic cross-section of a portion of a second substrate (22) of the cleaning article of FIG. 1. As illustrated in FIG. 7A, the second substrate (22) includes a scrim (30) that includes a plurality of filaments (612a, 612b, 612c, 612d), and a formed film (620). The filaments (612a, 612b, 612c, 612d) are substantially parallel to and spaced from each other. The formed film (620) includes a land (622), and a plurality of apertured extended cells (624) extending from the land (622) and away from the filaments (612a, 612b, 612c, 612d) of the scrim (30). FIG. 7B illustrates a single filament (612) with the formed film (620). As illustrated in FIGS. 7A and 7B, the formed film (620) is attached to the scrim (30) and encompasses at least 50% of the circumference of each filament (612, 612a, 612b, 612c, 612d).

With continued reference to FIGS. 7A and 7B, the location of the filaments (612) of the scrim (30) relative to the apertures (400) of the forming structure (306) may influence the shape of each apertured extended cell (624). For example, if a filament (612) passes over an aperture (400) near an edge of the aperture (400) thereby partially blocking the aperture (400), the polymer web will coat the filament (612) and be pulled into the aperture (400), which will bend the polymer web around the filament (612) so that the extended cell (624) will have a sidewall that is angled relative to normal (i.e., perpendicular) to the scrim. This bending of the polymer will cause part of the sidewall to be located directly underneath the filament, as illustrated in FIG. 6A, at the leftmost and rightmost filaments (612a) and (612d). Such bending of the sidewall of the extended cell (624) creates an angled scrubbing pocket (626) between the sidewall of the extended cell (624) and the filament (612). For an aperture (400) in the forming structure (306) that is not blocked by one or more filaments, an apertured extended cell (625) will more fully form and extend substantially normal or perpendicular to the scrim, as illustrated in FIG. 7A in between filaments (612b) and (612c), and create "neutral" (i.e., not angled) scrubbing pockets (628). The scrubbing pockets (626, 628) may be disposed on at least a portion of the second substrate (22). In particular, the scrubbing pockets (626, 628) may be discontinuous, i.e., it does not cover the second substrate (22), for scrubbing of soils on the target surface (102) (e.g., light duty cleaning), or the scrubbing pockets (626, 628) may be continuous, i.e., it covers the second substrate (22) for scrubbing of soils on the target surface (103) (e.g., heavy duty cleaning).

The more fully formed apertured extended cells will have larger apertures and longer sidewalls, as compared to the extended cells (34) that are at an angle relative to normal to the scrim (30). This random, but frequent, combination of "neutral" and angled scrubbing pockets oriented in different directions, as well as different lengths of the sidewalls (35) of the extended cells (34) may provide the second substrate (22) with good scrubbing action regardless of the direction of motion of the cleaning article (10) in use. The second substrate (22) may be used in conjunction with an absorbent material configured to deliver fluids to the second substrate (22) and/or absorb excess fluids. Details of the scrubbing action of the cleaning article (10) will be described hereinafter with reference to FIGS. 8, 9 and 10A to 10C.

To explain the way the first and second substrates (21, 22) work to provide a controlled amount of cleaning composition (11) for cleaning dishware, it is helpful to understand how addition of water to the cleaning article (10) dissolves the cleaning composition (11) within the water permeable pouch (20) and how a release of the dissolved cleaning composition (11) is generated.

Figure 10A:
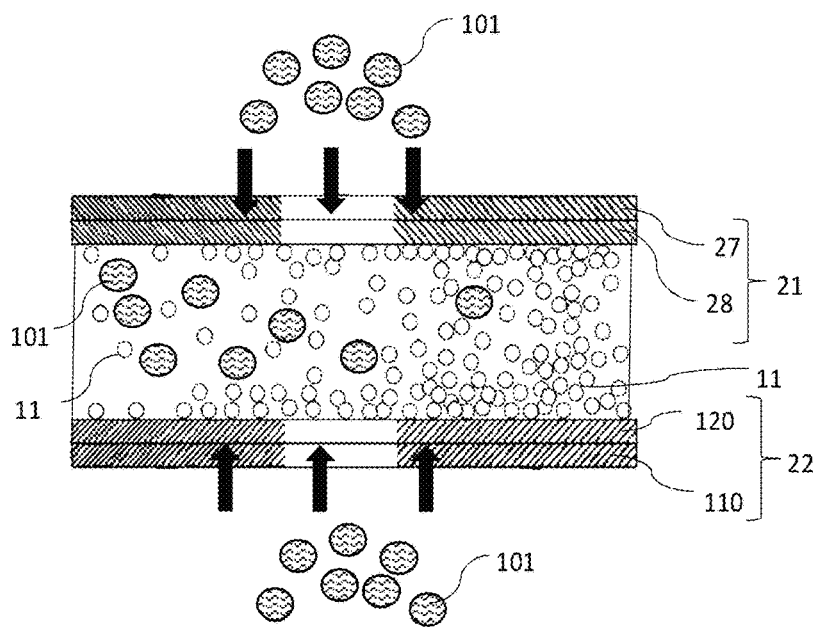
FIG. 10A to 10C are schematic drawings which show the movement of a cleaning composition (11) across at least one substrate in a hand dishwashing cleaning article (10) for cleaning hard surfaces according to the invention.
Figure 10B:
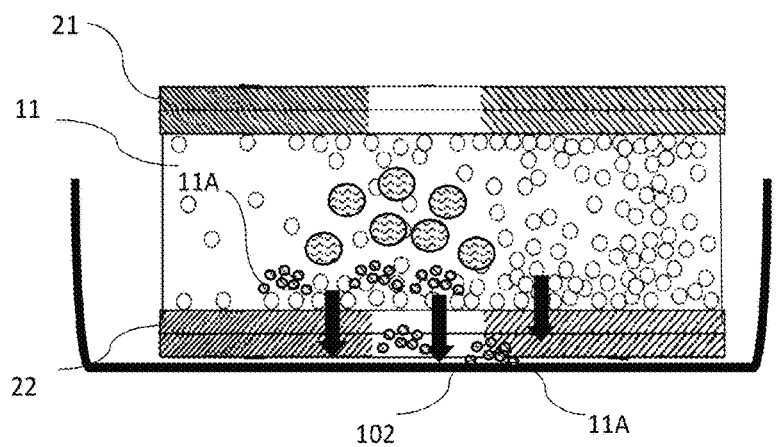
Figure 10C:
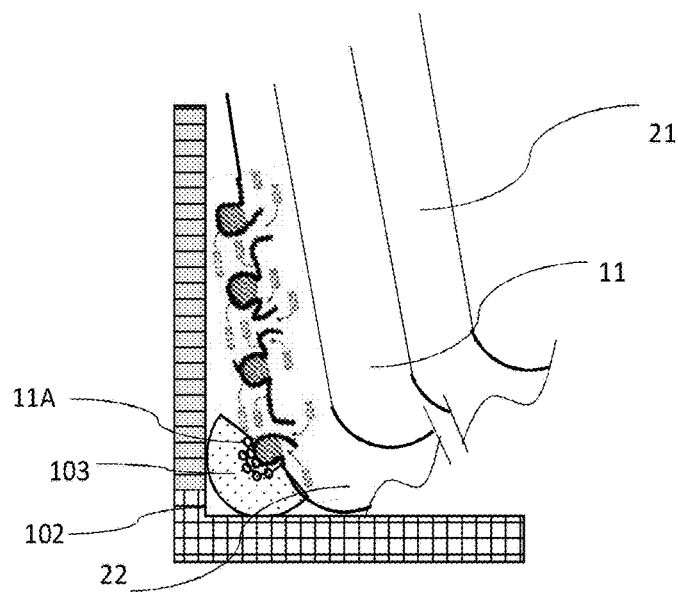

FIG. 8 is a cross-sectional schematic view of a cleaning article (10) according to the present invention, FIG. 9 is a detailed view of the cleaning article (10) of FIG. 8 before contact with water, and FIGS. 10A to 10C are schematic drawings which show the movement of a cleaning composition (11) across at least one substrate in the cleaning article (10).

The second substrate (22) can comprise at least a first film layer (110) and a second film layer (120). The first film layer (110) is preferably porous, for instance made out of non-woven, or comprises openings. The second film layer (120) can comprise apertures (24), wherein the apex (42) of the tapered capillaries (40) of the apertures (24) of the second film layer (120) are in intimate contact with the cleaning composition (11). As such, the second substrate (22) may be a bi-layer substrate. The scrim (30) can be bonded to the first film layer (110) using any suitable means, including gluing or cold-pressure welding.

Referring to FIG. 10A, when the cleaning article (10) is wetted with water (101) and the water (101) enters the pouch (20) from either the first or second substrate (21, 22), an amount of water (101) mixes with and dissolves the cleaning composition (11) to form dissolved cleaning composition (11A) (shown in FIG. 10B). Without wishing to be bound by theory, the amount of water (101) entering the first and/or the second substrate (21, 22) may be controlled by different configurations of pore size and pore distribution of the respective substrate.

Referring to FIG. 10B, the dissolved cleaning composition (11A) passes through the second substrate (22). When the cleaning article (10) contacts a target hard surface (102), the dissolved cleaning composition (11A) is released onto the target hard surface (102). An amount and/or a release rate of the dissolved cleaning composition (11A) from the cleaning article (10) may be controlled by controlling a rheology and/or a dissolution half-life of the cleaning composition (11) which will be explained in detail below.

FIG. 10C shows flexing or bending of the cleaning article (10) to clean a curved or angled profile of the target hard surface (102). Specifically, the flexing or bending of the cleaning article (10) may be achieved by defining a stiffness of the second substrate (22) and/or a compliance of the cleaning composition (11). The second substrate (22) comprises the scrim (30) coated by the elastic polymeric film (31) and is substantially defined by the apertured extended cells (34) of the elastic polymeric film (31) and scrubbing pockets (626) as described above with reference to FIG. 7A.

In particular, the scrubbing pockets (626) may bend or flex to maximize a contact area (through the sidewalls) for engaging soil (103) disposed on the target hard surface (102) which is difficult to access due to the angled/curved profile and dislodge the soil (103) from the target hard surface (102) upon movement of the cleaning article (10) to scrub the target hard surface (102) (shown in FIG. 10C). In addition to the good scrubbing action provided by scrubbing pockets (626), apertures (624) of the second substrate (22) allow fluids, such as water and/or the cleaning composition (11), to flow through the second substrate (22), which may enhance the scrubbing action even further.

Cleaning Composition

The cleaning composition (11) of the present invention may be compliant as discussed above. The cleaning composition (11) may have a compliance value 0.01-1.50 Kg/mm as determined in accordance with the Compliance Test described herein. Preferably, the cleaning composition (11) may have a dissolution half-life as determined in accordance with the Dissolution Rate Test. The cleaning composition (11) may have a dissolution half-life of from 1.0 min. to 15 min; from 1.1 min. to 13 min.; from 1.2 min. to 12 min; from 1.3 min. to 11 min.; from 1.4 min to 8.0 min; from 1.5 min to 5 min.; or any combinations thereof.

The cleaning composition (11) may be in the any suitable form. For example, the composition (11) may be in the form of soft-solid, paste, gel or a combination thereof, preferably semi-solid form. Additionally, the cleaning composition (11) may be of any shape desirable to a user. The cleaning composition (11) comprises from 5% to 50%, preferably from 10% to 45%, more preferably from 20% to 40%, most preferably from by weight of the total composition (11), of water. The cleaning composition (11) has a pH from 3 to 14, preferably from 6 to 13, more preferably from 7 to 11, most preferably from 7.5 to 10.

The cleaning composition (11) exhibits a complex viscosity from 10 Pascal-seconds (Pa·s) to 100,000 Pa·s in a temperature range from 25° C. to 90° C. according to the First Oscillatory Rheology Test as described herein.

First Oscillatory Rheology Test:

To measure the viscous (G") and elastic (G') moduli (loss and storage modulus) or factors and complex viscosity (n*) of a cleaning composition (11) at temperatures lower than 95° C., use a AR G2 Rheometer (TA Instruments, DE, USA) equipped with cross hatched lower and upper geometry, where a diameter of an upper geometry is 40 mm Measurement can be conducted by placing approximately 5 grams of cleaning composition (11) onto a lower test geometry and manually applying force to create an even flat surface. The sample can be compressed until the upper geometry is in full contact with cleaning composition (11) and a gap can be 1,000 microns. Conduct the oscillatory test over a temperature range of 25° C. to 90° C. at a frequency of 1.0 Hz using a constant oscillatory stress of 75 Pa utilizing a temperature ramp of 5° C. per minute.

Surfactants may be desired herein as they contribute to the cleaning performance of the cleaning compositions (11) of the present invention. Suitable surfactants are selected from the group consisting of a nonionic surfactant or a mixture thereof; an anionic surfactant or a mixture thereof; an amphoteric surfactant or a mixture thereof; a zwitterionic surfactant or a mixture thereof; a cationic surfactant or a mixture thereof; and mixtures thereof.

Specifically, the cleaning composition (11) may comprise from 1% to 60%; from 10% to 50%, more preferably from 20% to 40%, most preferably from 25% to 30%, by weight of the cleaning composition of a surfactant system. Preferably the surfactant system comprises an anionic surfactant and a primary co-surfactant.

Anionic Surfactant

Preferably, the surfactant system for the cleaning composition (11) of the present invention comprises from 60% to 90%, preferably from 70% to 85%, by weight of the surfactant system of an anionic surfactant. The anionic surfactant can be any anionic cleaning surfactant, preferably selected from sulphate and/or sulfonate and/or sulfosuccinate anionic surfactants. Especially preferred anionic surfactant is selected from the group comprising an alkyl sulfate, an alkyl alkoxy sulfate preferably an alkyl ethoxy sulfate, or mixtures thereof. Preferred anionic surfactant is an alkyl ethoxy sulfate, or a mixed alkyl sulfate-alkyl ethoxy sulfate anionic surfactant system, with a mol average ethoxylation degree of less than 5, preferably less than 3, more preferably less than 2 and more than 0.5.

Preferably the alkyl ethoxy sulfate, or mixed alkyl sulfate-alkyl ethoxy sulfate, anionic surfactant has a weight average level of branching of from 5% to 60%, preferably from 10% to 50%, more preferably from 20% to 40%. This level of branching contributes to better dissolution and suds lasting. It also contributes to the stability of the detergent at low temperature. Preferably the alkyl ethoxy sulfate anionic surfactant, or mixed alkyl sulfate-alkyl ethoxy sulfate anionic surfactant, has an average alkyl carbon chain length of from 8 to 16, preferably from 12 to 15, more preferably from 12 to 14, and preferably a weight average level of branching between 25 and 45%. Detergents having this ratio present good dissolution and suds performance.

When the alkyl ethoxylated sulfate anionic surfactant is a mixture, the average alkoxylation degree is the mol average alkoxylation degree of all the components of the mixture (i.e., mol average alkoxylation degree). In the mol average alkoxylation degree calculation the weight of sulfate anionic surfactant components not having alkoxylate groups should also be included.

Mol average alkoxylation degree=$(x1*$alkoxylation degree of surfactant $1+x2*$alkoxylation degree of surfactant $2+\ldots)/(x1+x2+\ldots)$ wherein $x1, x2, \ldots$ are the number of moles of each sulfate anionic surfactant of the mixture and alkoxylation degree is the number of alkoxy groups in each sulfate anionic surfactant.

If the surfactant is branched, the preferred branching group is an alkyl. Typically, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfate anionic surfactant used in the composition of the invention.

The branched sulfate anionic surfactant can be a single anionic surfactant or a mixture of anionic surfactants. In the case of a single surfactant the percentage of branching refers to the weight percentage of the hydrocarbyl chains that are branched in the original alcohol from which the surfactant is derived.

In the case of a surfactant mixture the percentage of branching is the weight average and it is defined according to the following formula:

Weight average of branching (%)=$[(x1*$wt % branched alcohol 1 in alcohol $1+x2*$wt % branched alcohol 2 in alcohol $2+\ldots)/(x1+x2+\ldots)]*100$ wherein $x1, x2,$ are the weight in grams of each alcohol in the total alcohol mixture of the alcohols which were used as starting material for the anionic surfactant for the detergent of the invention. In the weight average branching degree calculation, the weight of anionic surfactant components not having branched groups should also be included.

Suitable counterions include alkali metal cation earth alkali metal cation, alkanolammonium or ammonium or substituted ammonium, but preferably sodium.

Suitable examples of commercially available sulfates include, those based on Neodol alcohols ex the Shell company, Lial—Isalchem and Safol® ex the Sasol company, natural alcohols ex The Procter & Gamble Chemicals company. Suitable sulfonate surfactants for use herein include water-soluble salts of C8-C18 alkyl or hydroxyalkyl sulfonates; C11-C18 alkyl benzene sulfonates (LAS), modified alkylbenzene sulfonate (MLAS); methyl ester sulfonate (MES); and alpha-olefin sulfonate (AOS). Those also include the paraffin sulfonates may be monosulfonates and/or disulfonates, obtained by sulfonating paraffins of 10 to 20 carbon atoms. The sulfonate surfactant also include the alkyl glyceryl sulfonate surfactants.

Co-Surfactant

The surfactant system of the composition (11) of the present invention comprises a primary co-surfactant. Preferably, the surfactant system for the composition (11) of the present invention comprises from 10% to 40%, preferably from 12% to 35%, more preferably from 15% to 25%, by weight of the surfactant system of a primary co-surfactant. As used herein, the term "primary co-surfactant" means the non-anionic surfactant present at the highest level amongst all the co-surfactants co-formulated with the anionic surfactant. Preferably the primary co-surfactant is selected from the group consisting of an amphoteric surfactant, a zwitterionic surfactant, and mixtures thereof.

The composition (11) will preferably comprise an amine oxide as the amphoteric surfactant. Preferably, the amine oxide surfactant is selected from the group consisting of a linear or branched alkyl amine oxide surfactant, a linear or branched alkyl amidopropyl amine oxide surfactant, and mixtures thereof, more preferably a linear alkyl dimethyl amine oxide surfactant, even more preferably a linear C10 alkyl dimethyl amine oxide surfactant, a linear C12-C14 alkyl dimethyl amine oxide surfactant, and mixtures thereof, most preferably a linear C12-C14 alkyl dimethyl amine oxide surfactant.

Preferably, the amine oxide surfactant is alkyl dimethyl amine oxide or alkyl amido propyl dimethyl amine oxide, preferably alkyl dimethyl amine oxide and especially coco dimethyl amino oxide, most preferably C12-C14 alkyl dimethyl amine oxide.

Alternatively, the amine oxide surfactant is a mixture of amine oxides comprising a low-cut amine oxide and a mid-cut amine oxide. The amine oxide of the composition of the invention then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls or mixtures thereof; and b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl. In another preferred low-cut amine oxide for use herein R1 and R2 are both methyl. In an especially preferred low-cut amine oxide for use herein R1 and R2 are both methyl and R3 is n-decyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Compositions (11) comprising R7R8R9AO tend to be unstable and do not provide very suds mileage.

Preferably, the zwitterionic surfactant is a betaine surfactant. Suitable betaine surfactant includes alkyl betaines, alkylamidobetaine, amidazoliniumbetaine, sulfobetaine (INCI Sultaines) as well as the Phosphobetaine and preferably meets Formula (I):

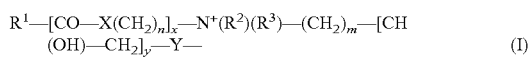

(I)

wherein

R1 is a saturated or unsaturated C6-22 alkyl residue, preferably C8-18 alkyl residue, in particular a saturated C10-16 alkyl residue, for example a saturated C12-14 alkyl residue;

X is NH, NR4 with C1-4 Alkyl residue R4, 0 or S, n is a number from 1 to 10, preferably 2 to 5, in particular 3, x is 0 or 1, preferably 1, R2 and R3 are independently a C1-4 alkyl residue, potentially hydroxy substituted such as a hydroxyethyl, preferably a methyl, m is a number from 1 to 4, in particular 1, 2 or 3, y is 0 or 1, and Y is COO, SO3, OPO(OR5)O or P(O)(OR5)O, whereby R5 is a hydrogen atom H or a C1-4 alkyl residue.

Preferred betaines are the alkyl betaines of the Formula (Ia), the alkyl amido propyl betaine of the Formula (Ib), the Sulfo betaines of the Formula (Ic) and the Amido sulfobetaine of the Formula (Id):

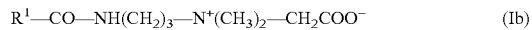

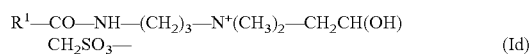

in which R1 has the same meaning as in Formula (I). Particularly preferred betaines are the Carbobetaine [wherein Y—=COO—], in particular the Carbobetaine of the Formulae (Ia) and (Ib), more preferred are the Alkylamidobetaine of the Formula (Ib).

A preferred betaine is, for example, cocoamidopropylbetaine.

Preferably, the surfactant system of the composition (11) of the present invention comprises a surfactant system wherein the weight ratio of the anionic surfactant to the primary co-surfactant, preferably the anionic surfactant to the amine oxide surfactant is less than 9:1, more preferably from 5:1 to 1:1, more preferably from 4:1 to 2:1.

Non-Ionic Surfactant

Preferably, the surfactant system of the composition (11) of the present invention further comprises from 0.1% to 10% by weight of the total composition of a secondary co-surfactant system. As used herein, the term "secondary co-surfactant" means the co-surfactant present at the second highest level asides from the anionic surfactant as the main surfactant, i.e., anionic surfactant present at the highest level and the amphoteric/zwitterionic/mixtures thereof as primary co-surfactant. Preferably the secondary co-surfactant system comprises a non-ionic surfactant. Preferably, the surfactant system of the composition (11) further comprises from 1% to 25%, preferably from 1.25% to 20%, more preferably from 1.5% to 15%, most preferably from 1.5% to 5% by weight of the surfactant system, of a non-ionic surfactant. Preferably, the non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Other suitable non-ionic surfactants for use herein include fatty alcohol polyglycol ethers, alkylpolyglucosides and fatty acid glucamides, preferably alkylpolyglucosides. Preferably the alkyl polyglucoside surfactant is a C8-C16 alkyl polyglucoside surfactant, preferably a C8-C14 alkyl polyglucoside surfactant, preferably with an average degree of polymerization of between 0.1 and 3, more preferably between 0.5 and 2.5, even more preferably between 1 and 2. Most preferably the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Preferably, the composition (11) comprises the anionic surfactant and the nonionic surfactant in a ratio of from 2:1 to 50:1, preferably 2:1 to 10:1.

Filaments

The cleaning composition (11) may include hygroscopic filaments. Hygroscopic filaments may be made of fibers, fines or mixtures thereof. Without wishing to be limited by theory, it is believed the fibers and fines may work together to form a network. This is believed to be contributed to, in part, by the length and aspect ratio of the fibers. The ability to form a network may be an important feature in order to minimize the common tendency of materials to crack when they lose solvent (water drying). Solvent loss causes dimensional changes with materials due to the loss of solvent volume. The cleaning composition (11) tends to therefore shrink, crack, or change its density. Shrinking and cracking are common in coatings when solvent is lost, the result of the internal stress created as the solvent volume is lost. It is more desirable for the cleaning composition (11) to shrink (which is a flow, or it acts as a viscous material to relax the stress) instead of crack (which is an elastic behavior, not a flow). Cracking may open up fissures allowing even faster solvent loss throughout the cleaning composition (11). Without wishing to be limited by theory, it is believed the filament may not allow cracking to occur due to long range order, i.e., network behavior.

The aspect ratio of a fiber describes the relationship between the length and diameter of the fiber and may be calculated by dividing end to end length by diameter. Aspect ratios acceptable for fibers used herein may include those above 9, above 9.5, above 10, above 100, above 1000, above 10,000, to 100, to 500, to 1000, to 10,0000, to 100,000, to 300,000, or any combinations thereof. It is also believed that the hygroscopic but water insoluble nature of filaments may further contribute to maintaining compliance upon repeated use. Hygroscopic filaments are water loving or hydrophilic by chemistry so may help to retain water in the cleaning composition (11). Additionally, by being water insoluble, certain filaments may remain in the cleaning composition (11) even after exposure to water enabling them to continue contributing the properties of the composition (11) through multiple uses instead of dissolving away. Other filaments may partially or fully dissolve during use enabling them to provide order to the composition (11) and provide soluble components that may help plasticize the cleaning composition (11). It may be beneficial for filaments or portions of the filaments to exit an article during use. For example, filaments may exit the cleaning article (10) through apertures (24) in the substrate(s) (21, 22) and this may work to enhance scrubbing or to give the appearance the article (10) is being depleted as the cleaning composition (11) is used over time. Lastly, it is also believed that the created network will increase the rheology of the cleaning composition (11) and as such slow down and control the product dissolution, thereby allowing the product to last longer for multiple uses.

The composition (11) may include from 3% to 50%, by weight of the cleaning composition (11), of the filaments. Additional acceptable levels may include from 10% to 45%, or from 20% to 40%, or from 25% to 35%, by weight of the cleaning composition (11). Preferably, the filaments include from 1% to 95%, by weight of the filaments, of fines and from 5% to 99%, by weight of the filaments, of fibers; or from 20% to 90%, by weight of the filaments, of fines and from 80% to 10%, by weight of the filaments, of fibers; or from 40% to 70%, by weight of the filaments, of fines, and from 60% to 30%, by weight of the filaments, of fibers. A filament may include a single type of fiber or multiple types of fibers. More preferably, the filaments include from 45% to 65%, by weight of the filaments, of fines and from 55% to 35%, by weight of the filaments, of fibers; or from 40% to 70%, by weight of the filaments, of fines, and from 60% to 30%, by weight of the filaments, of fibers. A filament may likewise include a single type of fine or multiple types of fines. Filaments may be, for example, natural, like from a plant or animal, modified natural, or a combination thereof. Examples of animal filaments may include wool, silk, and mixtures thereof. Plant filaments may, for example, be derived from a plant like wood, bark, oat, corn, cotton, cotton linters, flax, sisal, abaca, hemp, hesperaloe, jute, bamboo, bagasse, kudzu, corn, sorghum, gourd, agave, loofah, or mixtures thereof. One further example of a plant filament is a cellulose filament. Another exemplary filament may include a regenerated cellulose, like rayon. Wood pulp filaments may include, for example, hardwood pulp or softwood pulp. Non-limiting examples of hardwood pulp filaments may include filaments derived from a fiber source selected from the group consisting of: Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of softwood filaments may include filaments derived from a fiber source selected from the group consisting of: Pine, Spruce, Fir, Tamarack, Hemlock, Cypress, and Cedar. A filament may also be synthetic. Some examples of suitable synthetic hygroscopic filaments may include nylon, polyester, polyvinyl alcohol, starch, starch derivatives, pectin, chitin, chitosan, cellulose derivatives such as methylcellulose, hydroxypropylcellulose, alkoxy celluloses, or a combination thereof. Preferably the filaments comprise celluloses, preferably micro fibril celluloses, more preferably short and long cellulosic filaments The fibers will have a length and diameter. The fibers may have a length weighted average of 6 cm or less, 5 cm or less, 2 cm or less, 1 cm or less, 8 mm or less, 6 mm or less, about 4 mm or less, 3 mm or less, 2 mm or less, or 1 mm or less. The fibers may have an average diameter of about 15 µm, 20 µm, to 35 µm, to 40 µm, or any combination thereof. Fiber length may be used to help determine whether a particular fiber will require more energy to be mixed into a composition (11). For example, fiber lengths of greater than 1.0 mm were found to require more energy than desired to mix into a composition (11). Thus, fiber length values of less than 1.0 mm may be used where lower levels of energy are desired to incorporate the fiber into a composition (11).

The fibers may also have a kink angle. Fiber "kink" is a measurement of an abrupt change in the curvature of a fiber and is defined by the modified Kibblewhite's Kink Index. The angle of this abrupt change is defined as the "kink angle". Kink angle will affect the volume one fiber may occupy, essentially a fiber with a higher kink angle will occupy greater volume filling space more efficiently, this will affect the level of fiber needed to meet the desired compliance value. Exemplary fibers for use herein may have a kink angle of from 35 to 65, from 40 to 60, from 45 to about 55, or any combinations thereof.

Another property of fibers is the shape factor. The shape factor describes the ratio of the fiber end to end distance as projected in space and the fiber length as measured along the fiber. For instance, a straight fiber will have a high shape factor, since the end to end distance approaches the value of the length along the fiber, while a curly fiber will have a low shape factor. Exemplary fibers for use herein may have a shape factor of from 70 to 95.

One more property of a fiber is the curl value. The curl value describes the degree of non-straightness of a fiber. The STFI FiberMaster uses the following equation to calculate curl values: Curl value=[(100/Shape Factor)−1]*100. Exemplary fibers for use herein may have a curl value of 10 to 25.

Fines may have a greater surface area and are able to retain more solvent than higher aspect ratio fibers. Thus, fines may be used to help tune the cleaning composition (11) or article (10) to the desired compliance value. Fines may also be useful in formulating a composition (11) that will be used up over time. Fines that are smaller than the openings in the substrates (21, 22) may be separated from the composition (11) during use and exit the article (10) through the substrates (21, 22) openings allowing the composition (11) to become smaller during use and helping to signal the end of the life of the composition (11) or article (10). Fines may include both primary and secondary fines. Primary fines are naturally produced by the plant or animal source. Secondary fines are derived from fibers, meaning they start as fibers and then are processed into smaller pieces. Secondary fines may be derived, for example, from a natural fiber, like a plant fiber or animal fiber, a modified natural fiber, or a combination thereof. The fiber sources listed above are suitable for their primary fines or for their fibers to be converted into secondary fines and used herein. For example, a fine may include cellulose. Some exemplary cellulose filaments and fibers, and their respective properties are provided in Table 1.

selecting a filament with properties that tend to help lower compliance of a composition (11). So, as shown in the regression models, selection of a filament with any of the following properties: lower aspect ratio, shorter length, higher fines %, greater number of kinks/mm, greater shape factor, and/or greater curl value, has a tendency to give a lower compliance composition. Thus, a more crystalline surfactant system could be paired with a filament having one or a combination of those properties in order to balance the more rigid nature of the surfactant system and arrive at an acceptable compliance after drying. Conversely, a less crystalline surfactant system could be paired with filaments having any of the following: higher aspect ratio, longer length, lower fines %, lower number of kinks/mm, lower shape factor, and/or lower curl value, to balance the more fluid nature of this type of surfactant system to arrive at an acceptable compliance after drying.

Certain advantages and disadvantages are present with filament property selection. For example, the use of a filament with shorter fibers and a high fines content enables facile mixing with the surfactant system, however a higher wt % of such filaments may be needed to achieve a desired compliance. Conversely, filaments comprised of longer fibers and a lower wt % of fines can achieve desired compliance values at lower wt % in the composition (11). However, filaments with longer fibers and lower fines % are more difficult to process and require more energy to mix with surfactant systems. Thus, these properties can also be considered when formulating a cleaning composition (11). A mixture of fibers or fibers and fines can also be used to balance desired properties. Most preferably cellulosic structuring filaments are used, more preferably a mixtures of long and short chain cellulosic filaments.

Organic Solvent

The composition (11) of the present invention preferably comprises an organic solvent. Suitable organic solvents include C4-14 ethers and diethers, polyols, glycols, alkoxylated glycols, C6-C16 glycol ethers, alkoxylated aromatic alcohols, aromatic alcohols, aliphatic linear or branched alcohols, alkoxylated aliphatic linear or branched alcohols, alkoxylated C1-C5 alcohols, C8-C14 alkyl and cycloalkyl hydrocarbons and halohydrocarbons, and mixtures thereof.

TABLE 1

Filaments and Fibers

| Water insoluble, natural filament | Fiber length (mm) | Fiber width (μm) | Fiber Shape Factor | Fiber Curl Value | Fiber Kink Angle (deg) | Fiber Kink/ mm | Fiber Aspect ratio | Britt Jar Fines (%) |
|---|---|---|---|---|---|---|---|---|
| Example HG1 | 2.776 | 33.5 | 84.5 | 18.3 | 55.79 | 0.29 | 82.9 | <3 |
| Example HG2 | 1.224 | 21.8 | 87.7 | 14.0 | 50.66 | 0.51 | 56.1 | ~20 |
| Example HG3 | 0.760 | 33.1 | 89.7 | 11.5 | 48.73 | 0.48 | 23.0 | 26.2 |
| Example HG4 | 0.403 | 28.4 | 84.7 | 18.1 | 54.56 | 0.95 | 14.2 | 54.3 |
| Example HG5 | 0.350 | 24.9 | 81.6 | 22.5 | 51.75 | 1.03 | 14.1 | 72.3 |
| Example HG6 | 0.287 | 29.5 | 80.5 | 24.2 | 49.59 | 1.23 | 9.7 | 88.6 |

The analysis indicates that for a fixed wt of filament in the composition (20% for these examples), filament characteristics like % fines, aspect ratio, length, kink/mm, shape factor, and curl value can be used to modify the compliance of an article (10). Thus, the selection of filament properties can be used to enable a broader range of surfactant systems and concentrations to maintain desired compliant properties. For instance, surfactants with a higher crystallinity have a tendency to have a more rigid structure when in a dried composition (11). This tendency, however, can be combated by Preferably the organic solvents include alcohols, polyols, glycols, and glycol ethers, alternatively alcohols, polyols and glycols. The composition comprises from 0% to less than 50%, preferably from 1% to 25%, more preferably from 2% to 10%, or most preferably from 3% to 7%, by weight of the total composition of an organic solvent. The preferred organic solvent is glycerol.

Adjunct Ingredients

The cleaning composition (11) herein may optionally comprise a number of other adjunct ingredients such as builders (e.g., preferably citrate), chelants, conditioning polymers, cleaning polymers, surface modifying polymers, soil flocculating polymers, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g., carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike). Especially preferred is the presence of a preservative considering the continued exchange of water during the wash process rendering the product more viable for bacterial growth otherwise in between consequent wash operations. Preferably the preservative is low water soluble so as not to completely run out of the cleaning composition (11) during the initial uses of the pouch (20), sustaining its preserving action throughout the lifetime of the pouch (20) accordingly.

Viscosity Adjusters

The cleaning composition (11) may comprise from 0.1% to 10%, preferably from 0.5% to 5%, by weight of the cleaning composition (11) of a viscosity adjuster selected from the group consisting of mono-valent salts, di-valent salts, tri-valent salts, and mixtures thereof, preferably mono-valent salts, di-valent salts, and mixtures thereof. Examples of mono-valent salts, di-valent salts, and tri-valent salts may include, but are not limited to, potassium sulfate, sodium chloride, sodium sulfate, magnesium chloride, magnesium sulfate, sodium formate, sodium taurine, and (tri)sodium citrate. In a non-limiting, the viscosity adjuster may comprise magnesium sulfate. In a non-limiting example, the viscosity adjuster may comprise sodium chloride. Without wishing to be bound by theory, the addition of mono-valent salts, di-valent salts, tri-valent salts, and mixtures thereof is believed to improve the ability of a cleaning composition (11) to be processed as a shaped article that can be inserted between substrates to achieve the hand dishwashing article (10) according to the invention. Without wishing to be bound by theory, the addition of mono-valent salts, di-valent salts, tri-valent salts, and mixtures thereof, at the levels presently disclosed may shift the liquid phase or the surfactant phase from a micellar system to a lamellar liquid crystalline gel network, thus increasing the viscosity of the cleaning composition (11) and making it more processable.

Method of Manufacture of Substrate

Figure 11:
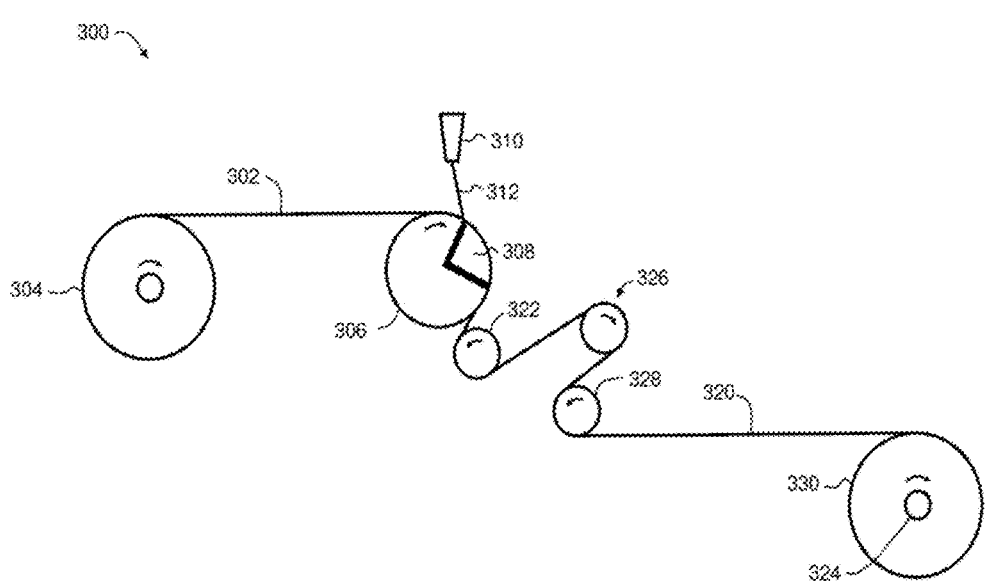
FIG. 11 is a schematic front view of an apparatus used to manufacture a second substrate (22) for the hand dishwashing cleaning article (10) of FIG. 8.

FIG. 11 illustrates an apparatus (300) that may be used to manufacture substrates for a cleaning article (10) according to the invention as described above. As illustrated, a scrim (302), such as the scrim (30) described above, may be unwound from a scrim roll (304) and fed to a forming structure (306), such as a rotating forming screen. An extrusion die (310) is located at the end of at least one extruder (not shown) and is configured to form a polymer web (312). The polymer web (312) may be a single layer or a multi-layer polymer web. The material used to form the polymer web (312) may comprise polyethylene (PE) and/or polypropylene (PP). Preferably, the material used to form the polymer web (312) may be a blend of one or more polymers selected from the group consisting of low density polyethylene (LDPE), linear low density polyethylene (LLDPE), high density polyethylene (HDPE), and polypropylene (PP). Preferably, the polymer web (312) may be a blend of, for example, low density polyethylene (LDPE) and high density polyethylene (HDPE). Preferably, the polymer web (312) may also include a surfactant and/or other additives, such as colorants, as desired.

Figure 12:
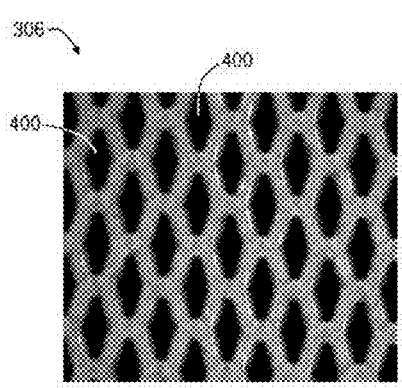
FIG. 12 is a picture of a forming structure that is part of the apparatus of FIG. 11.

As shown in FIG. 11, the polymer web (312) exits the extrusion die (310) and is deposited onto the scrim (302) as the scrim (302) is passing over the forming structure (306) as the forming structure (306) rotates around a fixed vacuum slot (308) in which a vacuum is pulled. The forming structure (306) includes a plurality of apertures (400) arranged in one or more patterns, as illustrated in FIG. 12. Preferably, the plurality of apertures (400) are sized and arranged so that there are 10-15 apertures per linear inch (4-6 apertures per linear centimeter), or a 10-15 "mesh pattern" as is understood by persons of ordinary skill in the art. FIG. 5 illustrates the scrim (302) on top of the forming structure (306) before the polymer web (312) is extruded on top of the scrim (302) and the forming structure (306). As illustrated, the apertures (400) in the forming structure (306) are smaller and of a different shape than openings (500) defined by filaments (510) of the scrim (302). An effect of the differences between the sizes of apertures (400) and openings (500) is described in further detail below.

When the polymer web (312) on the scrim (302) and the forming structure (306) passes over the vacuum slot (308), the portions of the polymer web (312) that are directly over the apertures (400) in the forming structure (306) are pulled into the apertures (400) to form extended cells (with or without apertures) that extend away from the scrim (302). The remaining portions of the polymer web (312) coat the exposed surfaces of the scrim (302) that are not in contact with the forming structure (306) and also contact the forming structure (306) in between the apertures (400). Because some of the apertures (400) in the forming structure (306) may be partially blocked by filaments of the scrim (302), some of the extended cells may be partially formed (and not actually be apertured) or have a different shape and/or size than the apertured extended cells that are formed without such obstructions, as described in further detail below. The pulling of the polymer web (312) around the filaments (510) of the scrim (302) and towards the apertures (400) in the forming structure (306) also causes the polymer web to attach to and encompass at least 50% of the circumference of each of the plurality of filaments (510) of the scrim (302), which secures the scrim (302) to the polymer web (312) and resulting formed film.

Returning to FIG. 11, the forming structure (306) also cools the polymer web (312) as it is transformed into a formed film so that the resulting second substrate (320), such as the second substrate (22) described above and below, may be pulled off of the forming structure (306) by a roller (322), conveyed to a winder (324) via additional rollers (326, 328), and wound into a roll (330) by the winder (324). Preferably, instead of extruding the polymer web (312) directly onto the scrim (302) and the forming structure (306), a polymer web that had been previously extruded onto a chilled roll and quenched into a solid polymer web may be reheated and conveyed to scrim (302) and the forming structure (306).

Figure 13:
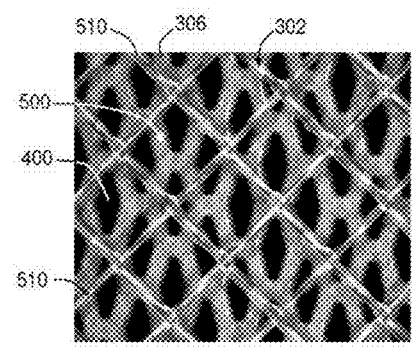
FIG. 13 is a picture of the scrim (30) of FIG. 7A on top of the forming structure of FIG. 12.

The apparatus (300) illustrated in FIG. 11 is used to extrude a polymer web (312) comprising low density polyethylene, high density polyethylene, a surfactant, and a colorant onto the scrim (302) and forming structure (306) (illustrated in greater detail in FIG. 13) after the scrim (302) was unrolled from the scrim roll (304) and fed to the forming structure (306). The polymer web (312) has a basis weight of about 36 grams per square meter (gsm). The scrim (302) has a basis weight of about 63 grams per square meter (gsm)

and polypropylene filaments having an average diameter of about 20 mils (about 508 micrometers or microns). Adjacent filaments are spaced apart by about 120 mils (about 3 millimeters) in one bias direction and by about 115 mils (about 2.9 millimeters) in the other bias direction. The forming structure (306) has apertures (400) in the shape of an elongated hexagon with two opposing sides shorter than the remaining sides, as illustrated in FIG. 4. The apertures (400) are arranged in a 13 mesh pattern, i.e., 13 apertures per linear inch (about 5 apertures per linear centimeter).

A suitable vacuum was generated in the vacuum slot (308) to pull the polymer web (312) against the forming structure (306) with the scrim (302) positioned therebetween, as well as pull portions of the polymer web (312) into the apertures (400) of the forming structure (306). The polymer web (312) transformed into the formed film portion of the second substrate (22) (as shown in FIG. 7A) as the polymer web (312) cooled on the forming structure (306). The second substrate (22) may be pulled off of the forming structure (306) with a roller (322) and wound into a roll (330) for making the water permeable pouch (20) of the cleaning article (10) according to the present invention.

The cleaning article (10) may be assembled by providing the first substrate (21), adding the cleaning composition (11), and then providing the second substrate (22). The cleaning article (11) is then formed by sealing the substrates (21, 22) via heat sealing, or chemical sealing, preferably chemical sealing. It will be understood that the orders can be reversed by providing the second substrate (22), adding the cleaning composition (11) and then providing the first substrate (21) before sealing the substrates (21, 22).

The following examples are intended to more fully illustrate the present invention and are not to be construed as limitations of the present invention since many variations thereof are possible without departing from the scope of the present invention. All parts, percentages and ratios used herein are expressed as percent weight unless otherwise specified.

Test Methods

The cleaning article, compositions, and substrates can include and/or exhibit specific physical properties as defined by the Water Flux Rate Test, the Consumption Rate Test, the Substrate and Article Tensile test, the Dissolution Rate test, an Oscillatory Rheology test, and/or the Compliance Test, which are described below. Further, soil removal performance of the cleaning article may be determined by the Soil Removal Test as described below.

A. Water Flux Rate Test

The Water Flux Rate Test can measure water permeability of a substrate. Without intending to be limited by theory, water permeability can be a principal determinant of surfactant longevity in a sudsing substrate that is used in a presence of water, especially running water. When a surfactant can be present, it can be desirable for the surfactant to suds quickly and profusely, yet be fully depleted at an intended time to signal disposability of a used substrate. If water flux rate is too low, e.g. zero or near zero, insufficient wetting of the surfactant contained in the substrate can cause suds to start too slowly. On the other hand, if water flux rate is too high, surfactant can be too readily flushed from the substrate, and the composition will not last long enough.

To measure the water flux rate, with tape or rubber bands, affix a substrate to the bottom of a plastic funnel with the following measurements: a 24 mm inner diameter (i.d.) at an exit, a 145 mm i.d. at the top, 135 mm height (from the top to an onset of a neck), a 20 mm length neck, and a total volume of about 600 mL. Apply sufficient tension to the substrate to ensure the substrate is completely flat, and no more. Affix tape and rubber bands as close as possible to the exit of the funnel to keep backflow from occurring under water pressure. Next, clamp the funnel in a ring stand over a sink. Measure out 600 mL of water at room temperature in a graduated cylinder. Then, with one hand blocking the funnel exit, pushing against the test substrate, quickly pour the water into the funnel. Once the funnel is completely filled, remove the hand and measure drainage time for the water to evacuate the funnel to a nearest tenth of a second. Stop timing when the water reaches a junction of the neck and a sloped portion of the funnel. Repeat this process 5 times per test substrate and average the measurements for each substrate.

Substrates which exhibit long drainage times (about 10 minutes or longer) can be tested by weighing the water drained in a set time period (e.g., 5 minutes) with a funnel full of water and then algebraically determining the flux time for 600 mL of water. Next, measure the water flux rate in the opposite substrate direction (unless the substrate is the same in both directions), and average both results. For substrates with high surface tension against water and small pores (i.e., flow is observed to increase significantly with small amount of surfactant added), add a small but sufficient amount of wetting agent to the water (e.g., Dawn® dish liquid), to at least a critical micelle concentration, so that water flows through the substrate unimpeded by wetting forces prior to the test. The water flux rate is expressed in $cm^3/cm^2/s$ according to the following equation: Water flux rate=(600 g water)×(1 $cm^3$/g)/((1.2 $cm)^2$×(average time in seconds)).

B. Consumption Rate Test

To measure the Consumption Rate and the mileage of a cleaning article or composition, use a rotary tumbler (Lortone, Inc., Seattle, Wash., USA model 33B or equivalent) with 4 in. diameter by 4 in. deep cylindrical rubber housing having 825 cc internal volume. The housing revolves on the tumbler at 43 rpm. Obtain a supply of tap water at about 7.5 grains water hardness and conductivity between 100 to not more than 400 microsiemens per centimeter μS/cm) and heat in a reservoir beaker to 38-45° C. Maintain the water supply at the target temperature within 1 degree for the test duration. Add 300.0 gm water from the reservoir to the housing. Weigh an article or composition to obtain the initial weight, and add the article or composition to the housing. Seal the housing with its accompanying watertight lid and place the sealed housing onto the rotary tumbler for exactly 15 minutes. Remove the housing, remove the housing lid, and retrieve the article or composition. Stir the remaining water in the housing for a few seconds and measure its conductivity and temperature using a Mettler Toledo Seven multimeter with InLab 740 probe or equivalent. Dry the article or composition surface by pressing, not rubbing, using paper towels with light hand pressure for about 30 seconds, until it is dry to the touch and transfers no more visible water to a dry paper towel using the same pressure at any point on its surface or edges. If the article or composition transfers partially dissolved or dissolving components in addition to liquid water, for example if the composition is a conventional bar soap it may transfer paste-like material, the transferred components are to be removed and the article or composition is considered dry when visible transfer is no longer evident. Weigh the article or composition. Empty and rinse the housing in hot tap water and dry it to complete 1 cycle. Repeat the cycle with the same article until the conductivity measurement is within 150 microsiemens per centimeter. This indicates that the surfactant has been almost completely consumed and the article would no longer be useful for cleaning dishes. The number of cycles that have been completed indicates the mileage of the article. To determine consumption, determine the amount of mass that has been consumed by subtracting the end weight of the article after it has completely dried from the beginning weight of the article. Divide the difference by the number of cycles completed to yield the consumption rate in g/use.

Repeat the test two more times with a new article or composition for a total of three times with each article and average the results for a consumption rate and a mileage score.

C. Substrate and Article Tensile Test

To measure the rigidity of a substrate and/or article, use a Texture Analyzer TA-XT2I (Texture Technologies Corp, NY, USA) tensile tester equipped with at least 5 Kg load cell and adjustable upper and lower grips at ambient conditions. Adjust a gauge length of an instrument (grip to grip closest distance) to 50 mm Cut 1 inch wide, long strips of the home care article or water insoluble substrate using a precision cutter in a machine direction (MD). (Note: Properties of an article can be measured by separating the cleaning composition from the substrates of the article by physical means and cutting 1 inch wide strips of the home care article with the cleaning composition removed.) If the strips are too short, adjust the gauge length of the instrument to accommodate the strips of the substrate, since the results are expressed in strain. Additionally, if the strips are too narrow, evaluate by normalizing results obtained to a 1 inch width arithmetically.

Affix the strips to grips in the instrument and program the instrument in tensile mode to pull at a rate of 5 mm/second and measure grams-force, using a 2.5 gram trigger to commence recording, for 20 seconds (100 mm). Next, record force at 10% strain in grams (5 mm) and divide the recorded force by 25.4 mm to express a stiffness value in units of grams per mm width (g/mm). Record peak force (grams) and divide the recorded peak force by width to generate the ultimate tensile strength in g/mm width of the article or substrate. For materials which exceed the capacity of a load cell, reduce the width of the strips or increase the load cell capacity to measure the stiffness and ultimate tensile strength.

D. Dissolution Rate Test

Obtain a straight walled glass beaker having an inside diameter (i.d.) of 63 mm and an inside height of 87 mm, (e.g., Pyrex 250 ml (No. 1000) which are widely available). Pour 150 grams of distilled water at ambient temperature (75° F.) into the beaker and add a Teflon® coated magnetic stir bar to the beaker. (Note: The stir bar can be nominally 1.5 inches long×5/16 inches diameter, octagonally shaped as viewed from the end, and can have a 1/16 in. wide molded pivot ring around its center where the diameter can be about 0.35 in.) Examples of a suitable stir bar can include Spinbar® magnetic stir bars available from Sigma Aldrich Corp. worldwide including Milwaukee, Wis., USA and at www.sigmaaldrich.com.

Measure and record the water conductivity of the water using a conductivity meter, e.g., a Mettler-Toledo Seven-Multi meter with InLab740 probe. (Note: The conductivity of the water should be about 2 microsiemens/cm (uS/cm) or less to indicate a low level of dissolved solids present.) Remove the conductivity probe from the water and place the beaker onto a digitally controlled laboratory stirrer, for example Ika® Werke RET Control-vise available, e.g., from DivTech Equipment Co, Cincinnati, Ohio, USA. Center the beaker on the stirrer and turn the stirrer on to obtain a constant rotation speed of 500 RPM to establish a vortex in the water which measures about 3 cm in depth from highest point of water at the beaker edge to the lowest point of air at the vortex center. Observe the vortex from above to ensure the beaker is centered and the magnetic stir bar is centered in the vortex. Weigh 1.0 grams of a composition pressed or formed together as a single unit and add it to the water near the beaker edge but not touching the beaker edge. Begin a timer and allow the water with composition to stir for 1 minute.

Turn off the stirrer. Insert the conductivity probe into the water in a location away from any undissolved material. Allow a measurement to stabilize for a few seconds and record conductivity. Turn the stirrer back on. Restart the timer as the digital readout passes 250 RPM. After an additional 1 minute has elapsed, turn off the stirrer and measure and record conductivity in the same manner as above. Turn the stirrer back on. Restart the timer as the digital readout passes 250 rpm. Repeat the process until a conductivity reading has been obtained every minute of stirring, for 5 minutes.

After taking a 5 minute conductivity reading, cap the beaker with a suitable watertight cover, e.g., plastic wrap. Shake the beaker vigorously for about 1 minute to dissolve remaining solids, using a vortex type agitator and/or mild heating in addition if necessary until all soluble components are observed dissolved by visible inspection. Cool the solution to less than 80° F. prior to the final measurement. Uncap the beaker, measure conductivity and record the value as a final conductivity.

Calculate the fractional dissolution (f) at each time point by the equation:

$$f=(\text{conductivity}-\text{water conductivity})/(\text{final conductivity}-\text{water conductivity}).$$

Calculate the dissolution half-life by fitting the fractional dissolution time series (6 points from 0 to 5 minutes) to a second order polynomial and calculate an interpolated or extrapolated result for a time at which a composition is half dissolved (i.e., f=0.5).

Dissolution half-life can be a measure of the propensity of a composition to resist solubilization by water. Bars of soap, for example, can have a dissolution half-life of 21.1 minutes (Ivory® Soap), exhibiting longevity and low consumption rate during use without a need for substrates as barriers to permeability. Liquid body wash can have a dissolution half-life of less than ½ minute and can be unsuitable as a composition for some articles.

E. Compliance Test

To measure the compliance of a composition and/or article, use a Texture Analyzer TA-XT2i (Texture Technologies Corp, NY, USA) equipped with at least a 5 Kg load cell and a 0.75 inch ball probe at ambient conditions, with the probe zero point at an article or composition top surface using 0.5 gram-force to register a probe height, and a 2 gram-force to commence data collection for both force and distance. Measure a compressive force (Kg) at a compression rate of 1 mm/sec over a depth of 5 mm, ensuring the composition and/or article form a flat surface over contact area with the ball probe, near the center of the article or composition.

Repeat measurements as needed (e.g., at least 3 times) to obtain a representative average value. To determine the compliance of the composition and/or article divide the maximum observed force (Kg) by the maximum compression depth (5 mm). When using a 5 Kg load cell some samples may exceed capacity, in this case the maximum compression depth will be less than the set depth of 5 mm, specified in the procedure.

F. Soil Removal Performance Test

Soil removal performance of a cleaning article may be evaluated according to the following steps:
1. Prepare the soiled stainless steel plate:
   a. Prepare the grease mixture by mixing together the following ingredients until homogenized:
      50 g each of sunflower oil, peanut oil and wheat germ oil;
      50 g of powdered egg albumin (Sigma Aldrich);
      5 g of flour; and
      2 g of red dye.
   b. Apply 3 g of the grease mixture to a stainless steel plate (approximately 3" wide×8.5" long) and spread it uniformly across the entire surface.
   c. Bake the plate @ 163° C. for 1 hr and 45 mins to polymerize the grease mixture. Remove from the oven and allow to sit overnight. Use the baked plate within 2 days.
2. Cut a piece of velcro (hook and loop) and the test sample to approximately 3" long×1" wide. Secure the hook side of the adhesive-backed velcro to a wooden block that is approximately 3" long×1" wide×1" tall. Secure the loop side of the adhesive-backed velcro to the sample. Stick the 2 sides of the velcro together to secure the test sample to the wooden block.
3. Secure the stainless steel plate with the polymerized grease mixture onto a flat surface.
4. Place the test sample face down against the flat surface. Apply a 700 g weight to the test sample. Traverse the test sample back and forth across the soiled plate for 3 revolutions (each back and forth equals 1 revolution) at a speed of approximately 480 inches per minute (24 in/rev×20 RPM). The test sample should start off of the plate, traverse across the entire length of the plate until it leaves the plate, and traverse back.
5. On a scale of 1-10, provide a grade to the stainless steel plate for the amount of grease removed from the area that was in contact with the test sample, with 1 representing no grease removed and 10 representing all of the grease removed. Multiple graders are preferred.
6. Repeat the test and average the 2 grades.

EXAMPLES

The following examples are intended to more fully illustrate the present invention and are not to be construed as limitations of the present invention since many variations thereof are possible without departing from the scope of the present invention. All parts, percentages and ratios used herein are expressed as percent weight unless otherwise specified.

Example I

The following Inventive and Comparative Samples in Table 2 are evaluated according to the Soil Removal Performance ("SRP") Test described hereinbefore. The results of the evaluation are provided in Table 3. The purpose is to evaluate the relative cleaning ability of Inventive Sample A and Comparative Sample A.

TABLE 2

| Inventive and Comparative Samples | |
| --- | --- |
| Inventive Sample A | Comparative Sample A |
| Substrate is a scrubbing wipe obtained from Tredegar Film Products under designation X-39094. | Substrate is formed film as disclosed in U.S. Pat. No. 9,554,978 B2. |

TABLE 3

| | Results | | | | | | |
| --- | --- | --- | --- | --- | --- | --- | --- |
| | Grade after 3 revolutions | | | | | | |
| | Rep. 1 | | | Rep. 2 | | | Overall |
| | Panelist 1 | Panelist 2 | Average | Panelist 1 | Panelist 2 | Average | Average |
| Inventive Sample A | 3 | 6 | 4.5 | 7 | 9 | 8 | 6.3 |
| Comparative Sample A | 1 | 2 | 1.5 | 2 | 4 | 3 | 2.3 |

Conclusion:

The above results show that Inventive Sample A (having a higher score of 6.3) removes grease better relative to Comparative Sample A (having a lower score of 2.3). Inventive Sample A differs from Comparative Sample A in that Inventive Sample A has a layer of scrim attached to a formed film which provides the function of improved cleaning ability that enables a benefit of easier tough food removal.

Example II

The following Examples are exemplary substrates suitable for making a water permeable pouch (20) for a hand dishwashing cleaning article (10) according to the present invention. Table 4 shows an exemplary example of a second substrate (22) comprising a scrim attached to an elastic polymeric film (31) for a hand dishwashing cleaning article (10) and the physical properties.

TABLE 4

| | | | Test Values | | | |
|---|---|---|---|---|---|---|
| | | | Blue Scrub with Scrim | | | |
| Characteristics | Unit | Direction of Test | Avg | StDev | Min | Max |
| Basis weight | g/m² | | 102.0 | 2.17 | 99.7 | 104.9 |
| Air permeability | m³/m²/min | Macro cones down | 100 | 10.34 | 86 | 121 |
| Embossed Thickness | mm | | 1141 | 39.19 | 1071 | 1189 |
| CoF | | Male/Steel | 0.34 | 0.01 | 0.32 | 0.37 |
| Tensile strength @ Peak | (N/2.54 cm) | MD | 30.0 | 1.49 | 27.0 | 32.0 |
| Elongation | % | MD | 553.0 | 20.12 | 521 | 587 |
| 5% Stress | (N/2.54 cm) | MD | 6.0 | 0.79 | 4.4 | 7.1 |
| Tensile strength @ Peak | (N/2.54 cm) | TD | 31.0 | 3.13 | 27.0 | 37.0 |
| Elongation | % | TD | 530.0 | 98.4 | 328.0 | 628.0 |
| 5% Stress | (N/2.54 cm) | TD | 3.6 | 0.59 | 2.4 | 4.3 |

Table 5 below shows an exemplary example of a first substrate for a hand dishwashing cleaning article (10) and the physical properties.

TABLE 5

| | | | Test Values | | | |
|---|---|---|---|---|---|---|
| | | | Cyan Soft Side Laminate | | | |
| Characteristics | Unit | Direction of Test | Avg | StDev | Min | Max |
| Basis weight | g/m² | | 28.6 | 0.2 | 28.35 | 28.82 |
| Air permeability | m³/m²/min | Macro cones down | 85 | 4.4 | 76 | 91 |
| Embossed Thickness | Mm | | 608 | 18.94 | 580 | 628 |
| CoF | | Male/Steel | 0.43 | 0.03 | 0.37 | 0.48 |
| Tensile strength @ Peak | (N/2.54 cm) | MD | 11.2 | 0.72 | 10.2 | 12.2 |
| Elongation | % | MD | 20.3 | 3.63 | 16 | 29 |
| 5% Stress | (N/2.54 cm) | MD | 6.3 | 0.88 | 4.4 | 7.6 |
| Tensile strength @ Peak | (N/2.54 cm) | TD | 3.1 | 0.19 | 2.8 | 3.3 |
| Elongation | % | TD | 110.4 | 21.3 | 87.0 | 158.0 |
| 5% Stress | (N/2.54 cm) | TD | 0.50 | 0.03 | 0.40 | 0.50 |

Table 6 below shows an exemplary example of a first substrate for a hand dishwashing cleaning article (10) and the physical properties.

TABLE 6

| | | | Test Values | | | |
|---|---|---|---|---|---|---|
| | | | "Spoke" Soft Side Laminate | | | |
| Characteristics | Unit | Direction of Test | Avg | StDev | Min | Max |
| Basis weight | g/m² | | 28.6 | 0.2 | 28.35 | 28.82 |
| Air permeability | m³/m²/min | Macro cones down | 85 | 4.4 | 76 | 91 |
| Embossed Thickness | mm | | 608 | 18.94 | 580 | 628 |
| CoF | | Male/Steel | 0.43 | 0.03 | 0.37 | 0.48 |
| Tensile strength @ Peak | (N/2.54 cm) | MD | 11.2 | 0.72 | 10.2 | 12.2 |
| Elongation | % | MD | 20.3 | 3.63 | 16 | 29 |
| 5% Stress | (N/2.54 cm) | MD | 6.3 | 0.88 | 4.4 | 7.6 |
| Tensile strength @ Peak | (N/2.54 cm) | TD | 3.1 | 0.19 | 2.8 | 3.3 |
| Elongation | % | TD | 110.4 | 21.3 | 87.0 | 158.0 |
| 5% Stress | (N/2.54 cm) | TD | 0.50 | 0.03 | 0.40 | 0.50 |

Example III

Table 7 shows an exemplary example of a cleaning composition for a hand dishwashing cleaning article (10) according to the present invention.

TABLE 7

Cleaning Composition

| Material | Formula Parts by weight of the Cleaning Composition (100% active basis) |
|---|---|
| Water | 17.56% |
| Superol K Kosher Glycerin | 5.00% |
| Geogard ® ECT | 1.00% |
| Benzyl Alcohol and Salicylic Acid | |
| Surfactant Paste* | 42.94% |
| Delta Fibe C7100 (cellulose)[1] | 21.45% |
| Delta Fibe C7200 (cellulose)[2] | 11.55% |
| Isis M4 2012 C | 0.50% |

[1]Delta Fibe C7100 (cellulose) is considered to be a fine as per the present disclosure, as manufactured by Sigma Aldrich (St. Louis, Missouri, United States).
[2]Delta Fibe C7200 (cellulose) is considered to be a fiber as per the present disclosure, as manufactured by Sigma Aldrich (St. Louis, Missouri, United States).
*Surfactant Paste comprises 22.21% C12C13 AES anionic surfactant, 5.05% C12C14 dimethyl amine oxide surfactant and 15.68% water by weight of the total cleaning composition.

Example IV

The following Samples in Table 8 are evaluated according to the Consumption Test Method described hereinbefore. Each test was run twice and the average of the two test results for each of the consumption rate and the mileage score are provided in Table 9. The purpose is to evaluate the consumption rate and mileage score of samples having different levels of fines and fibers to demonstrate the longevity of the sample during simulated use.

65 grams of each of the cleaning composition samples, according to Table 8, were prepared and placed within a pouch formed according to the present disclosure of: a bilayer composed of a multi-planar vacuum formed film of HDPE and LDPE blend having outwardly facing apertures and cones, 22 Hex (Tredegar material TP4694, manufactured by Tredegar,

| | | | Test Values | | | |
|---|---|---|---|---|---|---|
| Characteristics | Unit | Direction of Test | Avg | StDev | Min | Max |
| Basis weight | g/m² | | 28.6 | 0.2 | 28.35 | 28.82 |
| Air permeability | m³/m²/min | Macro cones down | 85 | 4.4 | 76 | 91 |
| Embossed Thickness | mm | | 608 | 18.94 | 580 | 628 |
| CoF | | Male/Steel | 0.43 | 0.03 | 0.37 | 0.48 |
| Tensile strength @ Peak | (N/2.54 cm) | MD | 11.2 | 0.72 | 10.2 | 12.2 |
| Elongation | % | MD | 20.3 | 3.63 | 16 | 29 |
| 5% Stress | (N/2.54 cm) | MD | 6.3 | 0.88 | 4.4 | 7.6 |
| Tensile strength @ Peak | (N/2.54 cm) | TD | 3.1 | 0.19 | 2.8 | 3.3 |
| Elongation | % | TD | 110.4 | 21.3 | 87.0 | 158.0 |
| 5% Stress | (N/2.54 cm) | TD | 0.50 | 0.03 | 0.40 | 0.50 | a vacuum formed film, 40 Hex of HDPE and LDPE blend having inwardly facing apertures and cones (Tredegar material TP4695, manufactured by Tredegar, Richmond, Va., USA); and a bilayer composed of a vacuum formed film, 40 Hex of HDPE and LDPE blend having inwardly facing apertures and cones (Tredegar material TP4695, manufactured by Tredegar, Richmond, Va., USA) and of a nonwoven laminate (Tredegar material TP4693, manufactured by Tredegar, Richmond, Va., USA. The Inventive Samples and Comparative Sample underwent evaluation according to the Consumption Rate Test Method.

TABLE 8

Inventive and Comparative Cleaning Composition Samples

| Formula Details | Water | Fines[1] | Fibers[2] | Surfactant Paste[3] | NaCl | Glycerin[4] | Total Solids | % Fines | % Fibers | Ratio Fines/Fibers |
|---|---|---|---|---|---|---|---|---|---|---|
| Sample 1 | Balance | 0.0 | 28.8 | 27.3 | 2.5 | 5.0 | 28.8 | 0.0% | 100.0% | 0.0 |
| Sample 2 | Balance | 28.8 | 0.0 | 27.3 | 2.5 | 5.0 | 28.8 | 100.0% | 0.0% | N/A |
| Sample 3 | Balance | 9.9 | 18.9 | 27.3 | 2.5 | 5.0 | 28.8 | 34.4% | 65.6% | 0.5 |
| Sample 4 | Balance | 14.4 | 14.4 | 27.3 | 2.5 | 5.0 | 28.8 | 50.0% | 50.0% | 1.0 |
| Sample 5 | Balance | 13.5 | 13.5 | 28.7 | 2.5 | 5.3 | 27.0 | 50.0% | 50.0% | 1.0 |
| Sample 6 | Balance | 17.6 | 11.6 | 27.3 | 2.5 | 5.0 | 29.2 | 60.3% | 39.7% | 1.5 |
| Sample 7 | Balance | 17.6 | 9.5 | 28.7 | 2.5 | 5.3 | 27.1 | 64.9% | 35.1% | 1.9 |
| Sample 8 | Balance | 18.9 | 9.9 | 27.3 | 2.5 | 5.0 | 28.8 | 65.6% | 34.4% | 1.9 |

[1]Delta Fibe C7100 (cellulose) is considered to be a fine as per the present disclosure, as manufactured by Sigma Aldrich (St. Louis, Missouri, United States).
[2]Delta Fibe C7200 (cellulose) is considered to be a fiber as per the present disclosure, as manufactured by Sigma Aldrich (St. Louis, Missouri, United States).
[3]Surfactant Paste comprises 22.21% C12C13 AES anionic surfactant, 5.05% C12C14 dimethyl amine oxide surfactant by weight of the total cleaning composition.
[4]SUPEROL ® KPO, Glycerin 99.7% USP/FCC (KOSHER) as manufactured by Nexeo Solutions (Conroe, Texas, United States).

It is to be noted that Applicant also made a sample not containing a salt. This sample could not be plodded.

The tests were run through two trials according to the Consumption Rate Test Method to produce an Average Mileage Score and an Average Consumption Rate.

TABLE 9

Mileage and Consumption Rate of Inventive and Comparative Samples of Table 8

| Sample | Average Mileage # of Cycles | Average Consumption Rate Average g/use* |
|---|---|---|
| Sample 1 | N/A | −1.2 |
| Sample 2 | 3.7 | 16.8 |
| Sample 3 | 7.7 | 0.9 |
| Sample 4 | 10.4 | 3.6 |
| Sample 5 | 11.7 | 3.6 |
| Sample 6 | 7.7 | 5.9 |
| Sample 7 | 6.6 | 7.3 |
| Sample 8 | 6.8 | 7.6 |

*Negative values indicate that product was not consumed but wash water was retained. Positive values indicate consumption of the product.

Conclusion:

The above results show that Sample 1, wherein the sample contained only fibers and no fines, the sample did not dissolve but instead retained wash water. The mileage could not be determined as the cleaning composition within the sample was found not to dissolve. Generally, Applicant has found that when there are too many fibers and no fines, the sample may dissolve too slowly or not at all. The slower the sample dissolve, fewer suds are produced or none are produced at all. When such samples dissolve too slowly or not at all, Applicant has found that the slow rate of dissolution results in inadequate suds production for cleaning, possibly providing a poor consumer experience. For Sample 2, wherein the sample contained only fines and no fibers, the sample dissolved too quickly. The faster samples dissolve, the less mileage will be obtained and can provide for a poor consumer experience. The above results further show that Samples 3-8, particularly Samples 4 and 5 wherein the ratio of fines to fibers is 1.0) provide very good consumption rates and mileage, translating into a positive consumer experience as the samples will provide adequate sudsing but the sample will also last a long time.

Incorporated and included herein, as if expressly written herein, are all ranges of numbers when written in a "from X to Y" or "from about X to about Y" format. It should be understood that every limit given throughout this specification will include every lower or higher limit, as the case may be, as if such lower or higher limit was expressly written herein. Every range given throughout this specification will include every narrower range that falls within such broader range, as if such narrower ranges were all expressly written herein. Unless otherwise indicated, weight percentage is in reference to weight percentage of the cleaning composition. All temperatures, unless otherwise indicated are in Celsius.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A hand dishwashing cleaning article, comprising:
   (a) a hand dishwashing cleaning composition having a first side and a second side, wherein the cleaning composition comprises:
      i) from about 1% to about 60%, by weight of the cleaning composition, of a surfactant system;
      ii) from about 3% to about 50%, by weight of the cleaning composition, of filaments comprising fibers, fines or mixtures thereof; and
      iii) from about 5% to about 50%, by weight of the cleaning composition, of water; and
   (b) a water permeable pouch formed around the cleaning composition, wherein the pouch comprises a first substrate adjacent to the first side of the cleaning composition and a second substrate adjacent to the second side of the cleaning composition, wherein the first substrate comprises a film comprising apertures and wherein the second substrate comprises an elastic polymeric film that comprises openings through which the cleaning composition is released from the cleaning article and a scrim of stretchable thermoplastic material laminated to the polymeric film, wherein the first substrate and the second substrate are bound to each other through an outer sealing rim to create an enclosed space to retain the cleaning composition,
   wherein the apertures comprise tapered capillaries having a base in the plane of the first substrate and an apex remote from the plane of the first substrate, having an average base opening dimension of from about 0.015 cm to about 0.635 cm, and an average apex opening dimension of from about 0.01 cm to about 0.254 cm; and
   wherein the scrim of the second substrate comprises a plurality of scrim filaments, and the elastic polymeric film of the second substrate encompasses at least about 50% of the circumference of each of the plurality of scrim filaments, the elastic polymeric film comprising a plurality of apertured extended cells extending away from the scrim wherein each of the apertured extended cells includes a continuous sidewall surrounding the apertured extended cells and, wherein the sidewalls of the apertured extended cells form scrubbing pockets with the scrim filaments.

2. The hand dishwashing cleaning article according to claim 1, wherein the cleaning composition comprises:
   a. from about 10% to about 50%, by weight of the cleaning composition, of the surfactant system;

b. from about 10% to about 45%, by weight of the cleaning composition, of filaments comprising fibers, fines or mixtures thereof; and c. from about 10% to about 45%, by weight of the cleaning composition, of water.

3. The hand dishwashing cleaning article according to claim 1, wherein the tapered capillaries have an average angle of taper (α) of from about 10° to about 60°.

4. The hand dishwashing cleaning article according to claim 1, wherein the apertures are arranged in a pattern having an average spacing (W) of at least about 0.4 mm, between centers of adjacent apertures.

5. The hand dishwashing cleaning article according to claim 4, wherein the apertures are arranged in an axially staggered pattern.

6. The hand dishwashing cleaning article according to claim 1, wherein the first substrate comprises an average from 5 apertures/cm$^2$ to 100 apertures/cm$^2$.

7. The hand dishwashing cleaning article according to claim 1, wherein the first substrate comprises at least one high modulus outer layer and at least one inner sealant layer, wherein the at least one high modulus outer layer and the at least one inner sealant layer comprise apertures, wherein the apex of the tapered capillaries of the apertures of the at least one high modulus outer layer are remote from the cleaning composition, and the apex of the tapered capillaries of the apertures of the inner sealant layer are in intimate contact with the cleaning composition.

8. The hand dishwashing cleaning article according to claim 7, wherein the first substrate comprises a Vacuum Formed Film (VFF) multilayer film, wherein the VFF multilayer film comprises the least one high modulus outer layer bound to at least one inner sealant layer.

9. The hand dishwashing cleaning article according to claim 1, wherein the first substrate comprises at least a first film layer and a second film layer, wherein first film layer is porous, and the second film layer comprises apertures, wherein the apex of the tapered capillaries of the apertures of the second film layer are in intimate contact with the cleaning composition.

10. The hand dishwashing cleaning article according to claim 1, wherein the elastic polymeric film is selected from the group consisting of: polyethylene, low density polyethylene, high density polyethylene and blends thereof.

11. The hand dishwashing cleaning article according to claim 1, wherein at least some of the sidewalls of the apertured extended cells extend in a direction normal to a plane containing the scrim, and wherein at least some of the sidewalls of the apertured extended cells extend in a direction angled relative to normal to the plane containing the scrim.

12. The hand dishwashing cleaning article according to claim 1, wherein the plurality of scrim filaments of the scrim comprise polypropylene.

13. The hand dishwashing cleaning article according to claim 1, wherein the plurality of scrim filaments has an average diameter in the range of from about 430 to about 560 micrometers.

14. The hand dishwashing cleaning article according to claim 1, wherein the plurality of apertured extended cells are arranged in a pattern of 4-6 apertured extended cells per linear centimeter.

15. The hand dishwashing cleaning article according to claim 1, wherein the filaments of the cleaning composition comprise cellulose.

16. The hand dishwashing cleaning article according to claim 1, wherein the filaments of the cleaning composition include from about 1% to about 95%, by weight of the filaments, of fines, and from about 5% to about 99%, by weight of the filaments, of fibers.

17. The hand dishwashing cleaning article according to claim 1, wherein the surfactant system comprises:

a. an anionic surfactant selected from the group consisting of alkyl sulfate, alkyl alkoxy sulfate and mixtures thereof;

b. a primary co-surfactant selected from amphoteric surfactant, zwitterionic surfactant and mixtures thereof; and c. optionally, a secondary co-surfactant selected from a non-ionic surfactant, an alkyl polyglucoside surfactant, or mixtures thereof.

18. The hand dishwashing cleaning article according to claim 1, wherein the cleaning composition further comprises from about 1% to about 25%, by weight of the cleaning composition of an organic solvent.

19. The hand dishwashing cleaning article according to claim 1, wherein the cleaning composition further comprises from about 0.1% to about 10%, by weight of the cleaning composition of a viscosity adjuster, wherein the viscosity adjuster is selected from the group consisting of mono-valent salts, di-valent salts, tri-valent salts, and mixtures thereof.

20. A method of manually washing dishware comprising the steps of:

a) wetting with water an article according to claim 1; and b) contacting the dishware with the wetted article; and c) optionally, rinsing the dishware.

* * * * *